US011846095B2

(12) United States Patent
Olsson et al.

(10) Patent No.: US 11,846,095 B2
(45) Date of Patent: Dec. 19, 2023

(54) HIGH FREQUENCY AC-POWERED DRAIN CLEANING AND INSPECTION APPARATUS AND METHODS

(71) Applicant: SeeScan, Inc., San Diego, CA (US)

(72) Inventors: Mark S. Olsson, La Jolla, CA (US); Stephanie M. Bench, Carlsbad, CA (US); Jan Soukup, San Diego, CA (US); Inho Shin, San Diego, CA (US); David A. Cox, San Diego, CA (US); Alexander L. Warren, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

(21) Appl. No.: 15/670,845

(22) Filed: Aug. 7, 2017

(65) Prior Publication Data

US 2018/0038093 A1 Feb. 8, 2018

Related U.S. Application Data

(60) Provisional application No. 62/371,836, filed on Aug. 7, 2016.

(51) Int. Cl.
*E03F 9/00* (2006.01)
*B65H 75/40* (2006.01)
(Continued)

(52) U.S. Cl.
CPC ............. *E03F 9/005* (2013.01); *B65H 75/40* (2013.01); *B65H 75/4486* (2013.01);
(Continued)

(58) Field of Classification Search
CPC ................. B65H 2701/32; B65H 2701/34; B65H 75/40; B65H 75/4486; E03C 1/302;
(Continued)

(56) References Cited

U.S. PATENT DOCUMENTS 3,643,007 A * 2/1972 Roberts ............. H01B 11/1808
174/106 R
3,764,779 A * 10/1973 Kadoya .................. H01B 7/282
219/201

(Continued)

FOREIGN PATENT DOCUMENTS

JP 2000107927 A * 4/2000
JP 2001150223 A * 6/2001
JP 2015231605 A * 12/2015

OTHER PUBLICATIONS

JP-2000107927-A—English Machine Translation (Year: 2000).*
(Continued)

*Primary Examiner* — Marc Carlson
(74) *Attorney, Agent, or Firm* — Steven C. Tietsworth, Esq.; Michael J. Pennington, Esq.

(57) ABSTRACT

Systems, devices, and methods for drain cleaning using high voltage, high frequency AC electrical power supplied through a video push-cable are disclosed. In one embodiment, a drain cleaning system may include a cable for carrying electrical control and/or data signals as well as alternating current (AC) power at a high voltage and high frequency relative to AC mains frequencies.

29 Claims, 17 Drawing Sheets

(51) Int. Cl.

| | |
|---|---|
| *B65H 75/44* | (2006.01) |
| *H04N 5/225* | (2006.01) |
| *H01B 7/02* | (2006.01) |
| *H01B 7/04* | (2006.01) |
| *H01R 13/58* | (2006.01) |
| *E03C 1/302* | (2006.01) |
| *H01B 1/02* | (2006.01) |
| *H01B 3/08* | (2006.01) |
| *H01B 3/48* | (2006.01) |
| *H04N 23/54* | (2023.01) |

(52) U.S. Cl.
CPC ............. *E03C 1/302* (2013.01); *H01B 1/02* (2013.01); *H01B 3/08* (2013.01); *H01B 3/48* (2013.01); *H01B 7/02* (2013.01); *H01R 13/5841* (2013.01); *H04N 23/54* (2023.01); *B65H 2701/32* (2013.01); *B65H 2701/34* (2013.01); *H01B 7/041* (2013.01)

(58) Field of Classification Search
CPC .. E03F 9/005; H01B 1/02; H01B 3/08; H01B 3/48; H01B 7/02; H01B 7/041; H01R 13/5841; H04N 5/2253
See application file for complete search history.

(56) References Cited

U.S. PATENT DOCUMENTS

| | | | | |
|---|---|---|---|---|
| 4,319,074 A * | 3/1982 | Yaste | ...................... | H01B 7/02 174/116 |
| 4,939,317 A * | 7/1990 | Hostler | .............. | H01B 11/1847 174/107 |
| 5,199,129 A * | 4/1993 | Salecker | ................. | B08B 9/045 15/104.33 |
| 5,500,488 A * | 3/1996 | Buckel | .............. | H01B 11/1808 174/102 R |
| 6,362,432 B1 * | 3/2002 | LaPidus | ................. | H01B 7/041 174/113 R |
| 7,439,447 B2 * | 10/2008 | Galey | ...................... | H01B 7/16 174/105 R |
| 8,547,428 B1 * | 10/2013 | Olsson | .............. | G01N 21/8803 348/84 |
| 9,328,858 B2 * | 5/2016 | Penza | ...................... | F16L 55/26 |
| 9,477,147 B2 * | 10/2016 | Chapman | ............. | G01N 21/954 |
| 10,356,360 B2 * | 7/2019 | Chapman | .............. | H01B 11/04 |
| 10,371,305 B1 * | 8/2019 | Olsson | .................. | F16L 55/28 |
| 10,557,824 B1 * | 2/2020 | Olsson | .................. | G01N 27/82 |
| 10,764,541 B2 * | 9/2020 | Olsson | .................. | H01B 3/306 |
| 10,834,364 B2 * | 11/2020 | Olsson | .................. | H04N 7/183 |
| 2004/0222009 A1 * | 11/2004 | Blew | .................. | H01B 3/441 174/110 F |
| 2005/0275725 A1 * | 12/2005 | Olsson | ................ | G03B 37/005 348/207.99 |
| 2006/0006875 A1 * | 1/2006 | Olsson | .................. | G01V 3/081 324/338 |
| 2007/0000682 A1 * | 1/2007 | Varkey | .................... | D07B 1/147 174/102 R |
| 2009/0166035 A1 * | 7/2009 | Almaguer | ............... | E21B 43/11 166/254.1 |
| 2010/0208055 A1 * | 8/2010 | Olsson | .................. | H01B 7/182 348/84 |
| 2013/0014971 A1 * | 1/2013 | Muto | .................... | H01B 3/306 174/110 SR |
| 2013/0186670 A1 * | 7/2013 | Person | .................... | C08K 5/06 174/110 SR |
| 2013/0196857 A1 * | 8/2013 | Mukoyama | .............. | C01G 3/00 505/230 |
| 2016/0168913 A1 * | 6/2016 | Hay | ........................ | E21B 7/067 175/57 |
| 2016/0173829 A1 * | 6/2016 | Olsson | .................. | H04N 7/183 348/84 |
| 2017/0076838 A1 * | 3/2017 | Maunder | ................ | H01B 7/041 |

OTHER PUBLICATIONS

JP-2015231605-A—English Machine Translation (Year: 2015).*
International Searching Authority, "Written Opinion of the International Searching Authority" for PCT Patent Application No. PCT/US17/045750, dated Mar. 20, 2018, European Patent Office, Munich.

* cited by examiner

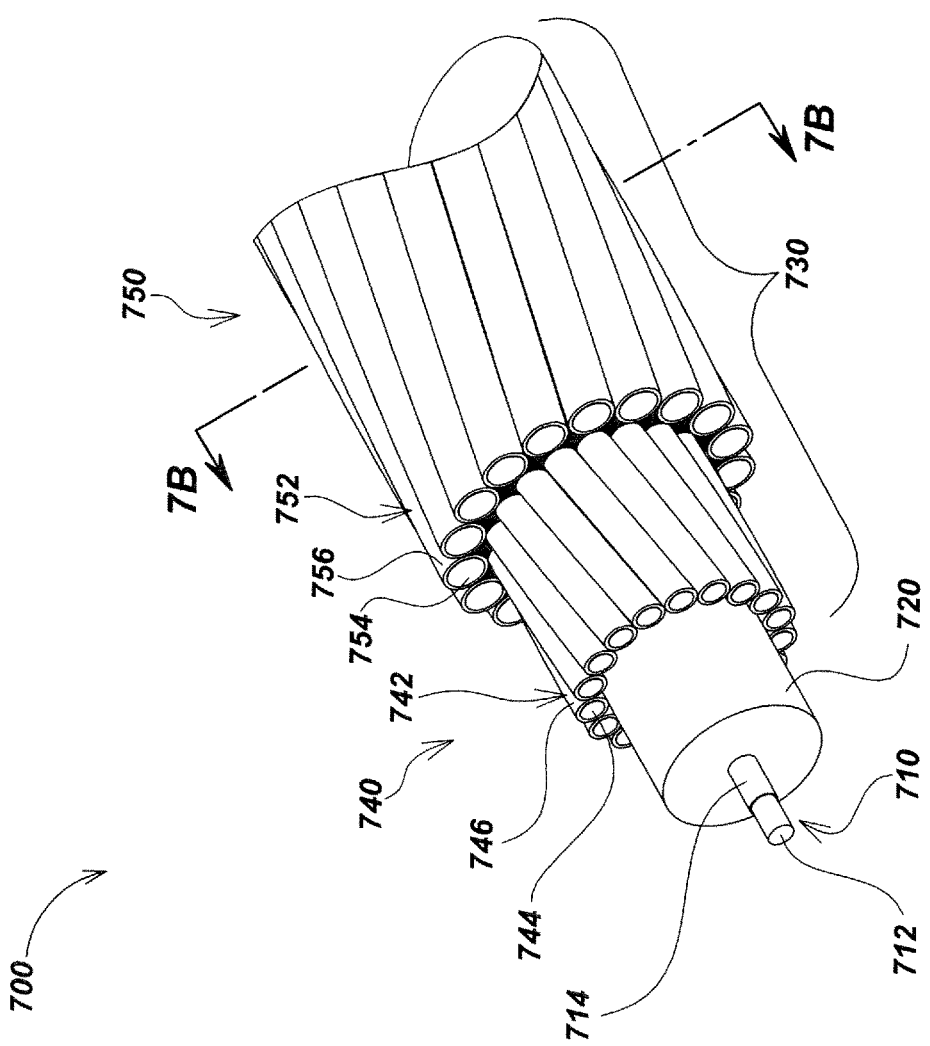

HIGH FREQUENCY AC-POWERED DRAIN CLEANING AND INSPECTION APPARATUS AND METHODS

CROSS-REFERENCE TO RELATED APPLICATIONS

This application claims priority under 35 U.S.C. § 119(e) to U.S. Provisional Patent Application Ser. No. 62/371,836, entitled HIGH FREQUENCY AC-POWERED DRAIN CLEANING AND INSPECTION APPARATUS & METHODS, filed on Aug. 7, 2016, the content of which is hereby incorporated by reference herein in its entirety for all purposes.

FIELD

This disclosure relates generally to systems, devices, and methods for cleaning or clearing obstructions from the interior of drains, pipes, and other conduits or voids. More specifically, but not exclusively, this disclosure relates to drain cleaning devices, systems, and methods powered by electrical power at high voltage and sufficiently high frequencies so as to minimize human contact safety risk.

BACKGROUND

Drain pipes are often prone to obstructions through a variety of mechanical, structural, and/or environmental factors such as invasion by tree roots and/or other vegetation, build-up of corrosion, as well as other blockages. Devices, systems, and methods for clearing such obstructions within such drain pipes or other cavities are well known in the art.

Some drain cleaning devices rely on the flow of pressurized air or fluids to directly dislodge or otherwise clear obstructions. In certain drain cleaning devices, pressurized air or fluids are used with a cutting/cleaning apparatus that clears away obstructions within the pipe. In other drain cleaning devices, such as plumbing snake cleaning devices, a rotating cable, which may have blades or other cleaning implements connected at the end, are deployed from a drum reel into a pipe to cut away or otherwise dislodge blockages via the rotational force of the cable. Another cleaning method involves pouring chemicals into the drains to attempt to dissolve obstructions.

Although such devices/solutions are useful, they can suffer from numerous drawbacks. For instance, whereas chemical treatments may be convenient and effective in clearing small organic material obstructions, chemical treatments may be ineffective in clearing other more serious or difficult obstructions. Furthermore chemicals used in such treatments for clearing pipes may be hazardous to humans or other biological organisms as well as sewer pipes or certain other types of pipes. Further, pipe cleaning devices utilizing pressurized fluids or air, as well as snake-type devices utilizing a rotating cable, may be suited for certain types of obstructions but can be unwieldy to operate. The unwieldiness of pressurized or rotating cables in such devices and systems can make them hazardous to operate, and have been known to result in human injury and even death. Moreover, such devices are typically heavy and bulky, and thus preclude their use in small diameter pipes or other physically small conduits.

Further, such devices, in particular those employing a rotating cable, tend to be inefficient in the expenditure of energy in accelerating the entire mass of the cable to rotate. Furthermore, some of these devices use DC power, such as from batteries. In such devices, the inefficiency of accelerating the mass of the cable may impose an unnecessary load on batteries, and long cables can result in line power loss. Other devices use AC line power (i.e., 50 or 60 Hz AC mains power). In such devices, the inefficiencies of accelerating the mass of the cable can limit the speed at which the cable turns within the pipe.

Accordingly, there is a need in the art to address the above-described as well as other problems in the field.

SUMMARY

This disclosure relates generally to systems, devices, and methods for cleaning or clearing obstructions from the interior of drains, pipes, and other conduits or voids. More specifically, but not exclusively, this disclosure relates to drain cleaning devices, systems, and methods powered by high frequency AC power, where the AC power frequency used is significantly above AC line power frequencies. The frequency and power levels may be selected to minimize human contact harm at high voltage levels, while also efficiently delivering energy to a cutting tool and/or other devices, such as cameras, sondes, lights, and the like, coupled at the distal end of the cable.

In one aspect the disclosure relates to a drain cleaning device having an electrically powered cleaning apparatus disposed upon the distal end of a cable for operation from a high frequency AC power supply, either directly or via AC frequency conversion or AC to DC conversion. The cleaning apparatus may include an electric motor to rotate one or more cleaning implements and/or other AC power cutting or cleaning devices or apparatus. Additional devices, such as cameras, sondes, lights, and the like may also be powered by high frequency AC power, either directly or through frequency conversion. The cable may be dispensed from a drum reel and into a pipe or other conduit.

In another aspect, the drain cleaning system may be configured to safely carry high voltage high frequency electrical power at low loss via the cable and power an electric motor of the cleaning apparatus by appropriate frequency, power, and cable configuration selection.

In another aspect, the operating speed of the motor on the cleaning apparatus may be variable. Clocking of the motor may, in some embodiments, be achieved off the AC signal, such as by varying the AC power amplitude and/or frequency and/or otherwise modulating the signal or providing an additional signal or signals.

In another aspect, the cleaning implements may be readily user replaceable, such as line trimmer type line ("weed wacker") or removable cutting heads or other cutting devices.

In another aspect, the cleaning implements may be plastic or metal blades. Such blades may be spring loaded and deploy through the centrifugal force provided by the motor. The blades or line may flex under spin loading and move outward to contact the interior of the pipe walls or blockage.

In another aspect, the spin direction of an electric motor of the various cleaning apparatus described herein may be reversible such that the cleaning implements may be adjusted to spin and/or may be adjusted to cut in either direction by changing the AC power signal amplitude and/or frequency, and/or by modulating or providing data in the AC power. Direction and/or speed may be remotely controlled or may be adjusted using an automatic control circuit, which may include loading or other sensors to determine cutting efficiency, speed, or other parameters, in or near the cutting head at the distal end of a push-cable.

In another aspect, the drain cleaning systems may include a pipe inspection camera operatively coupled along a portion of or at the distal end of a cable. Such a camera may include an image sensor for generating images of an interior of a pipe or cavity in which the camera element is inserted. The camera may collect video, still images, or both and may provide digital or analog video or images. Further, the camera may include a light source for illuminating the interior of pipes or other conduits and obstructions thereof. The camera may be integral with the drain cleaning systems/apparatus. Further, the camera may be a self-leveling camera. The camera may be powered via the high power and high frequency AC power source or may have separate power provided via the push-cable or other source, such as a battery.

In another aspect, a high frequency drain cleaning system may include a magnetic field utility locating device for measuring magnetic signals emitted from the cable carrying the high frequency AC signal and determine and map its location in the ground by sensing magnetic fields emitted from the cable.

In another aspect, a cable feed device may automatically move a cable without the need for a user to apply force to move the cable, such as via a drive motor or other powered cable feeding and/or retracting device.

In another aspect, a jacketless cable may be used with a powered cable feeding device.

In another aspect, a cleaning apparatus may be combined with a pipe inspection camera for both cleaning and inspecting the interior of pipes and may be driven by high frequency AC power supplied via a cable adapted for high voltage AC power transmission.

Various additional aspects, features, functions, and details are further described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 7A is a detailed fragmentary isometric view of a cable embodiment for providing high frequency AC power.

DETAILED DESCRIPTION OF EMBODIMENTS

Overview

Figure 1:
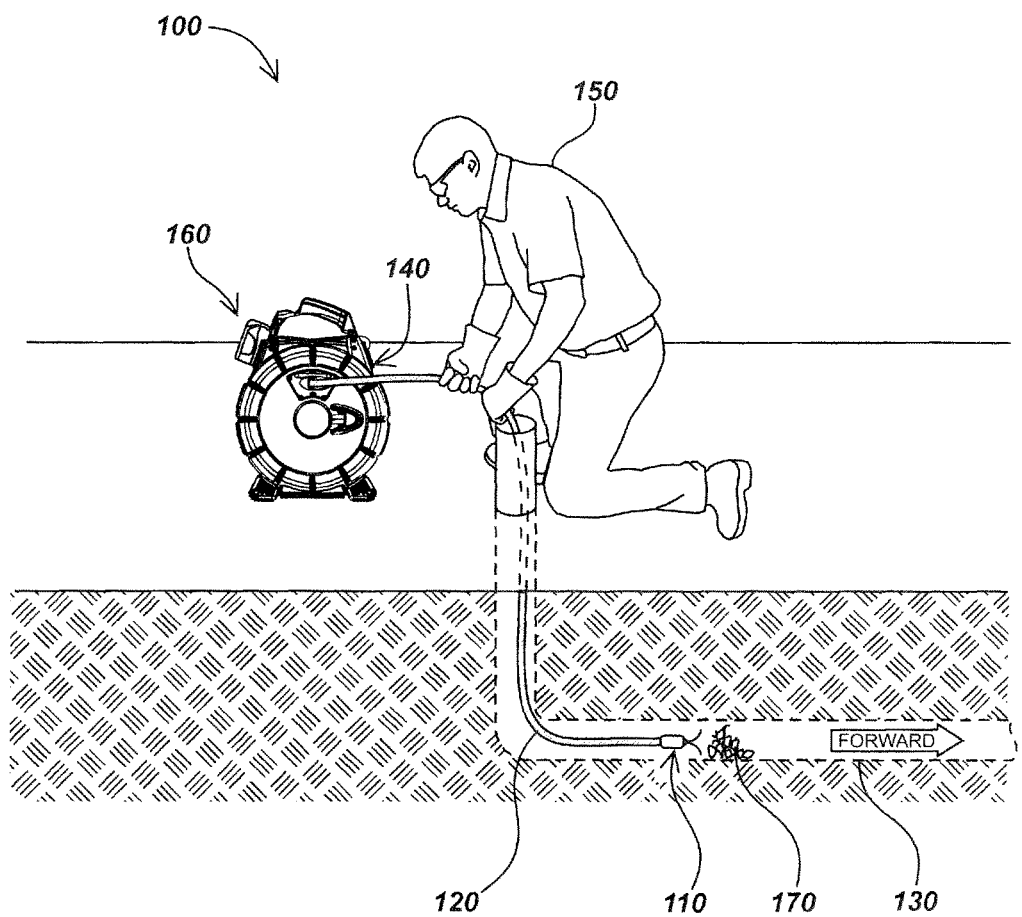
FIG. 1 illustrates details of an embodiment of a high frequency AC powered drain cleaning system embodiment.

This disclosure relates generally to systems, devices, and methods for cleaning or clearing obstructions from the interior of drains, pipes, and other conduits or voids. More specifically, but not exclusively, this disclosure relates to drain cleaning devices, systems, and methods powered by high frequency AC electrical power.

Details of the systems, devices, and methods referred herein and additional components, methods, and configurations that may be used in conjunction with the embodiments described subsequently herein are disclosed in co-assigned patent applications including U.S. Pat. No. 5,808,239, issued Sep. 15, 1998, entitled VIDEO PUSH-CABLE; U.S. Pat. No. 7,221,136, issued May 22, 2007, entitled SONDES FOR LOCATING UNDERGROUND PIPES AND CONDUITS; U.S. patent application Ser. No. 12/704,808, filed Feb. 12, 2010, entitled PIPE INSPECTION SYSTEM WITH REPLACEABLE CABLE STORAGE DRUM; U.S. patent application Ser. No. 13/647,310, filed Oct. 10, 2012, entitled PIPE INSPECTION SYSTEM APPARATUS AND METHODS; U.S. Pat. No. 8,289,385, issued Oct. 16, 2012, entitled PUSH-CABLE FOR PIPE INSPECTION SYSTEM; U.S. patent application Ser. No. 13/826,112, filed Mar. 14, 2013, entitled SYSTEMS AND METHODS INVOLVING A SMART CABLE STORAGE DRUM AND NETWORK NODE FOR TRANSMISSION OF DATA; U.S. patent application Ser. No. 13/913,485, filed Jun. 9, 2013, entitled MULTI-CAMERA PIPE INSPECTION APPARATUS, SYSTEMS, AND METHODS; U.S. patent application Ser. No. 13/925,636, filed Jun. 24, 2013, entitled MODULAR BATTERY PACK APPARATUS, SYSTEMS, AND METHODS INCLUDING VIRAL DATA AND/OR CODE TRANSFER; U.S. patent application Ser. No. 14/033,349, filed Sep. 20, 2013, entitled PIPE INSPECTION SYSTEM WITH SNAP-ON PIPE GUIDES; U.S. Pat. No. 8,587,648, issued Nov. 19, 2013, entitled SELF-LEVELING CAMERA HEAD; U.S. patent application Ser. No. 14/216,358, filed Mar. 17, 2014, entitled SMART CABLE STORAGE DRUM AND NETWORK NODE SYSTEM AND METHODS; U.S. patent application Ser. No. 14/216,552, filed Mar. 17, 2014, entitled SYSTEMS & METHODS FOR DATA TRANSFER USING SELF-SYNCHRONIZING QUADRATURE AMPLITUDE MODULATION (QAM); U.S. Pat. No. 8,908,027, issued Dec. 9, 2014, entitled ASYMMETRIC DRAG FORCE BEARING FOR USE WITH PUSH-CABLE STORAGE DRUM; U.S. patent application Ser. No. 14/642,596, filed Mar. 9, 2015, entitled PIPE CLEARING CABLES AND APPARATUS; U.S. patent application Ser. No. 14/690,285, filed Mar. 17, 2015, entitled PIPE INSPECTION SYSTEM WITH PUSH-CABLE, JETTER, AND CAMERA HEAD; U.S. Pat. No. 8,984,698, issued Mar. 24, 2015, entitled LIGHT WEIGHT SEWER CABLE; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. patent application Ser. No. 14/846,623, filed Sep. 4, 2015, entitled PIPE INSPECTION SYSTEM CAMERA HEADS; U.S. patent application Ser. No. 14/935,878, filed Nov. 9, 2015, entitled INSPECTION CAMERA DEVICES AND METHODS WITH SELECTIVELY ILLUMINATED MULTISENSOR IMAGING; U.S. patent application Ser. No. 14/970,362, filed Dec. 15, 2015, entitled COAXIAL VIDEO PUSH-CABLES FOR USE IN INSPECTION SYSTEMS; U.S. Pat. No. 9,222,809, issued Dec. 29, 2015, entitled PORTABLE PIPE INSPECTION SYSTEMS AND APPARATUS; U.S. patent application Ser. No. 15/050,267, filed Feb. 22, 2016, entitled SELF-LEVELING CAMERA HEADS; U.S. Pat. No. 9,277,105, issued Mar. 1, 2016, entitled SELF-LEVELING CAMERA HEADS; U.S. Provisional Patent Application No. 62/371,836, filed Aug. 7, 2016, entitled HIGH FREQUENCY AC-POWERED DRAIN CLEANING AND INSPECTION APPARATUS AND METHODS; U.S. patent application Ser. No. 15/264,355, filed Sep. 13, 2016, entitled HIGH BANDWIDTH VIDEO PUSH-CABLES FOR PIPE INSPECTION SYSTEMS; U.S. Pat. No. 9,448,376, issued Sep. 20, 2016, entitled HIGH BANDWIDTH PUSH-CABLES FOR VIDEO PIPE INSPECTION SYSTEMS; U.S. patent application Ser. No. 15/289,703, filed Oct. 10, 2016, entitled METHODS AND APPARATUS FOR CLEARING OBSTRUCTIONS WITH A JETTER PUSH-CABLE APPARATUS; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. Pat. No. 9,521,303, issued Dec. 13, 2016, entitled CABLE STORAGE DRUM WITH MOVABLE CCU DOCKING APPARATUS; U.S. patent application Ser. No. 15/590,964, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS. The content of each of the above-described patents and applications is incorporated by reference herein in its entirety. The above-described patent applications and patents may be referred to herein collectively as the "co-assigned applications" or "incorporated applications."

In one aspect the disclosure relates to a drain cleaning device having a high power and high frequency AC electrically powered cleaning apparatus disposed upon the end of a cable. The cleaning apparatus may include an electric motor to rotate one or more cleaning implements. The cable may be dispensed from a drum-reel and into a pipe or other conduit. In one example, the drain cleaning device may be integral within the drum-reel.

In another aspect, the drain cleaning system may be configured to safely carry high voltage high frequency electrical power signal at low loss via the cable and power an electric motor of the cleaning apparatus.

In another aspect, the operating speed of the motor on the cleaning apparatus may be variable. Clocking of the motor may, in some embodiments, be achieved off the AC signal.

In another aspect, the cleaning implements may be readily user replaceable such as line trimmer type line.

In another aspect, the cleaning implements may be plastic or metal blades. Such blades may be spring loaded and deploy through the centrifugal force provided by the motor. The blades or line may flex under spin loading and move outward to contact the interior of the pipe walls or blockage.

In another aspect, the spin direction of an electric motor of the various cleaning apparatus described herein may be reversible such that the cleaning implements may be spun and cut in either direction.

In another aspect, the drain cleaning systems may include a pipe inspection camera or array of cameras. Such a camera or cameras may further include a light source adequate for illuminating the interior of pipes or other conduits and obstructions thereof. The camera(s) may collect video, still images, or both.

In another aspect, a high frequency drain cleaning system may include a utility locating device for measuring magnetic signals from the cable carrying the high frequency AC signal and determine and map its location in the ground.

In another aspect, a cable feed device is disclosed for automatically moving a cable without the need for a user to apply force to move the cable.

In another aspect, the present disclosure includes a cleaning apparatus combined with a pipe inspection camera for both cleaning and inspecting the interior of pipes.

The term "exemplary" is used herein to mean "serving as an example, instance, or illustration." Any aspect and/or embodiment described herein as "exemplary" is not necessarily to be construed as preferred or advantageous over other aspects and/or embodiments.

Example High Frequency Drain Cleaning Devices, Systems, and Methods

As illustrated in FIG. 1, an exemplary embodiment of a drain cleaning system 100 may include a cleaning apparatus 110 disposed about the distal end of a cable 120. Cable 120 and other cables as described herein may advantageously carry alternating current (AC) power electrical signals, particularly high voltages at high frequencies (relative to AC mains frequencies of 50 or 60 Hz), transmitted at low loss to a cleaning apparatus and, in some embodiments, cameras or like pipe cleaning or inspection devices as well as data signals between devices connected by cables.

Such cables may be or share aspects of the cables described in subsequent paragraphs and/or the incorporated U.S. patent application Ser. No. 14/970,362, filed Dec. 15, 2015, entitled COAXIAL VIDEO PUSH-CABLES FOR USE IN INSPECTION SYSTEMS. In one embodiment, a cable such as cable 120 includes a structural core including a steel alloy and a dielectric layer, and the outer layer including a cladding of a high electrical conductivity material. The cable further includes two or more layers of shield conductors, for example, a first layer of shield conductors helically wounded about the dielectric layer in a first direction, and a second layer of shield conductors helically wounded about the first layer in a direction opposite to the first direction. The shield conductors may comprise a steel alloy.

The cables may allow for the transmission of high frequency and high voltage AC electrical power in a physically small cable. As used herein, high frequency AC means alternating current signals provided at high voltages with the frequencies selected to minimize the potential harm caused by direct or indirect contact to the high voltage through cable damage or failure or other power leakage mechanisms from the cable or associated power supply and/or cutting tools or other electrically coupled devices or systems. In one example, the power may be at an AC frequency of one thousand Hertz or higher and a voltage may be of one hundred volts or higher. In another example, the power may be at an AC frequency of ten thousand Hertz or more and the voltage may be of one hundred volts or higher. In yet another example, the power may be at an AC frequency of one hundred thousand Hertz or more and a voltage of one hundred volts or higher. Further, the power may be at an AC frequency pre-selected so as to minimize physical harm in the event of a cable failure when operated at a predefined power level at a predefined high voltage. In an exemplary embodiment the combination of frequency and power of the signal is selected at least partially based on skin effect of high frequency current flow such that physiological harm in the event of cabling or other component failure is minimized in operation.

Figure 9:
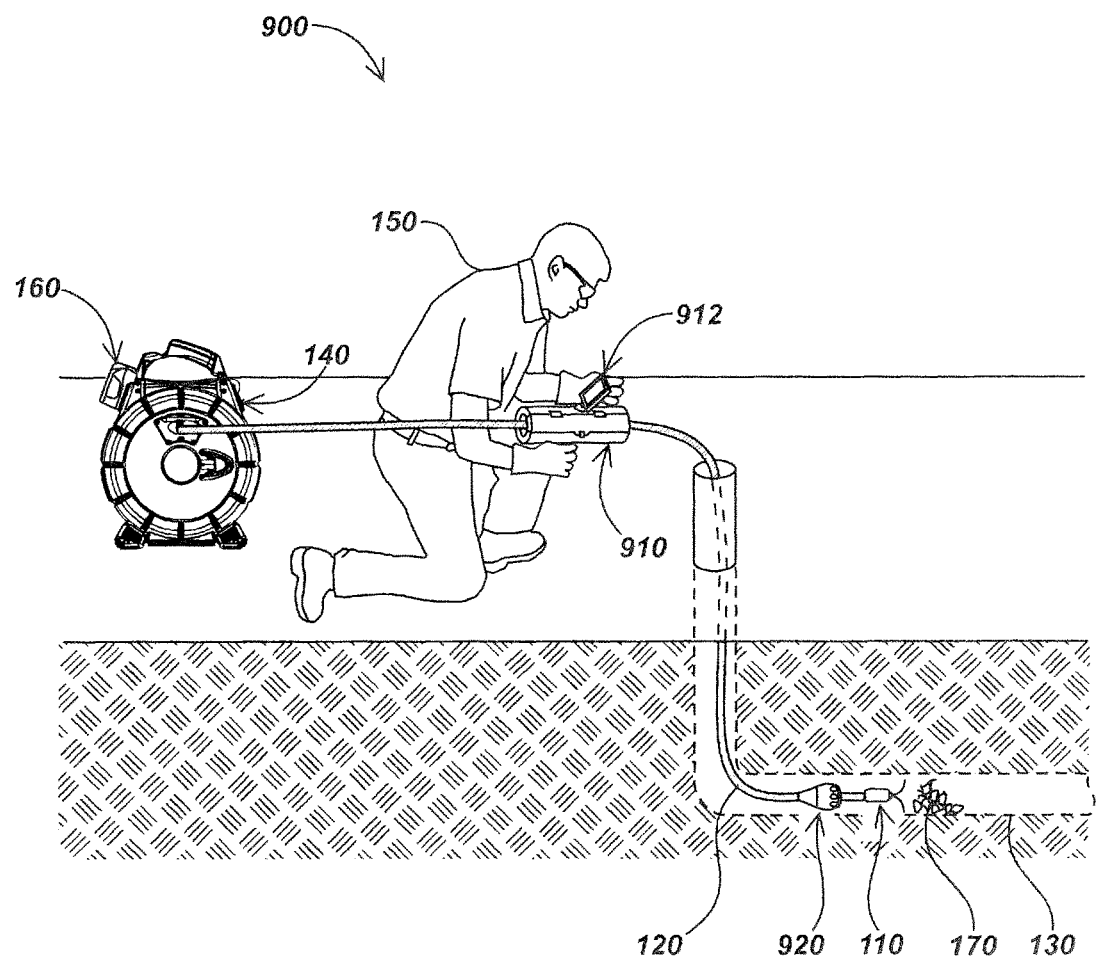
FIG. 9 illustrates details of another embodiment of a high frequency AC powered drain cleaning system embodiment with a cable feeding device embodiment.

The cable 120, with cleaning apparatus 110 secured thereto, may be dispensed from within a drum reel 140 and into drain pipe 130. In system embodiment 100, a user 150 may force the cable 120 with attached cleaning apparatus 110 into drain pipe 130 or other conduit. In other embodiments, a cable feed mechanism in the drum reel or as a separate device, such as cable feed device 910 of FIG. 9, may be used to provide force needed to move a cable within a pipe or other conduit. The drain cleaning system 100 may include a power source, such as battery 160, to provide an AC electrical signal (e.g., through an inverter or other DC to AC power conversion device), which may be high voltage AC electrical power at high frequency (relative to standard line power provided at 50 or 60 Hz), that may then be transmitted via cable 120 to power the cleaning apparatus 110. For example, the AC power signal may in some embodiments be at one or more discrete frequencies in the range of 100 to 1 Khz, or in other embodiments frequencies in the range of 1 Khz to 10 KHz, or in another embodiment frequencies in the range of 10 KHz to 100 KHz, or in another embodiment frequencies in the range of 100 KHz to 1 MHz.

In other embodiments, other power sources, including but not limited to 50 or 60 Hz AC electrical line power, may be used in a drain cleaning system in keeping with the present disclosure. The electrical signal may be high voltage AC electrical power at high frequencies. For instance, the voltage may be selected to be sufficiently high (e.g., 200-600 volts) to transmit electrical power signals at low loss and power the motor at a selected frequency, such as to motor 560 (FIG. 5), while the selected frequencies or frequencies are selected to be high enough (e.g., 30-200 kHz or higher) to provide safety to user or others that may come in contact with power leaked from the drain cleaning system. In some embodiments, actions and control of the motor, such as motor 560 of FIG. 5, may optionally be clocked or coordinated off of the high frequency AC power signal, such as directly or via a clock multiplier or divider circuit or other frequency synthesizing circuitry. The drain cleaning systems and apparatus described herein may include integrated fault detection circuitry. In some embodiments the AC power signal may be modulated to carry data or other signals or information content to and/or from the distal to the proximal end, such as through amplitude, frequency, pulse-width modulation, phase modulation, and/or other modulation schemes of the provided power signal.

Providing power to a cleaning apparatus such as cleaning apparatus 110 (or camera or other device not shown in FIG. 1) as AC power rather than DC power may provide various advantages in various embodiments. For example, power signals may be provided at higher voltages to transmit electrical power at low loss using higher frequencies to reduce the potential for user harm due to lower skin penetration of currents at higher frequencies. Some cable configurations may be adapted so as to have conductors positioned to take advantage of the skin effect of currents flowing at high frequencies, such as by using thin layered coaxial or other high frequency cable circuitry and construction geometries. In addition, some systems may require or otherwise benefit from power provided at high frequencies for powering devices that use various powering schemes requiring periodic increases in power (e.g., varying power to a motor of a cleaning apparatus or providing variable lighting for a camera head) such as is disclosed in the incorporated applications. Pulse width modulation or other modulation schemes such as this may be used in some embodiments.

Figure 8:
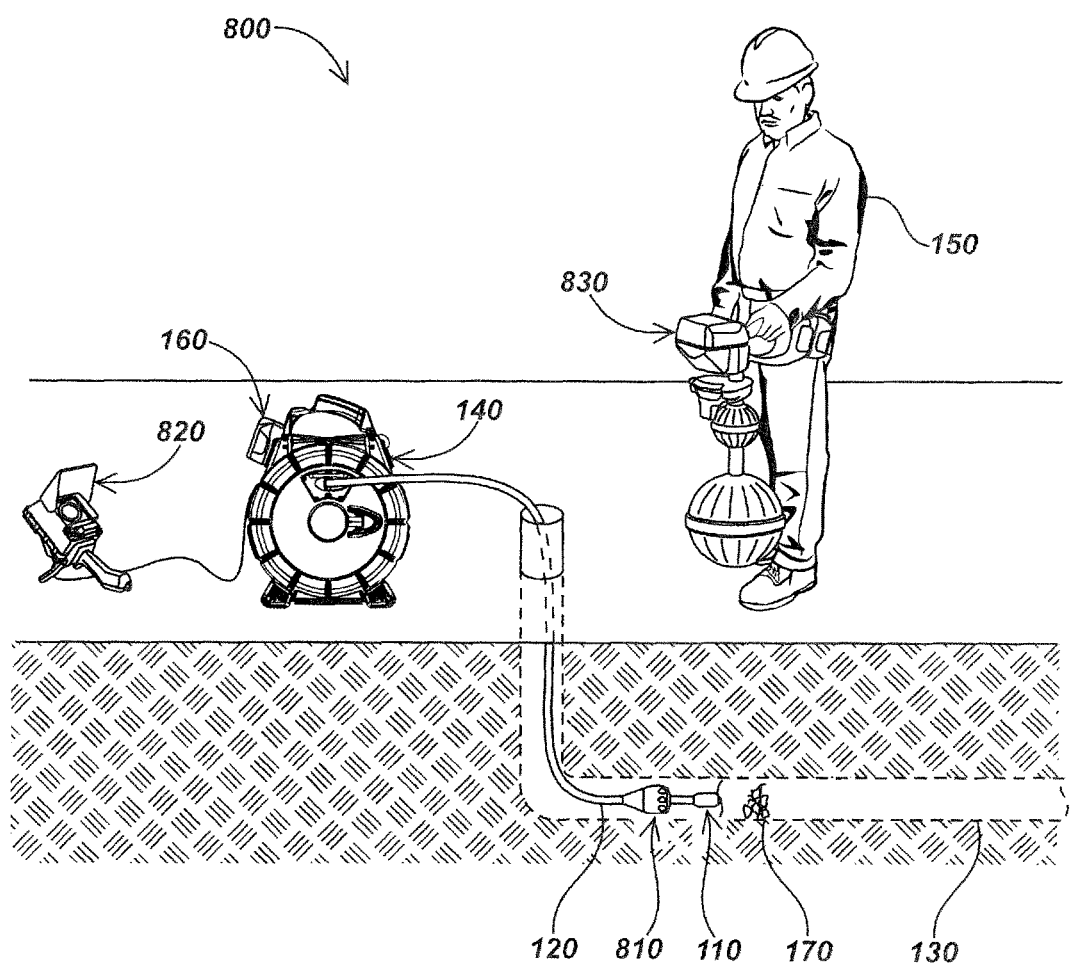
FIG. 8 illustrates details of another embodiment of a high frequency AC powered drain cleaning system embodiment that includes pipe inspection camera, a camera control unit (CCU), and a magnetic field sensing buried utility locator device.

Use of AC power at higher frequencies may provide other advantages, such as allowing reduced transformer size, improving efficiency, allowing for safer transmission of higher voltages, and the like. Furthermore, a utility locating device, such as utility locator device 830 held by user 150 as shown in FIG. 8, may use concomitantly arising magnetic fields of higher frequency signals applied to a cable to determine and map the location of the cable such as is described in the incorporated applications. For instance, the frequency at which the AC power signal is driven and carried by the cable may be selected so as to provide a utility locating current signal of the same frequency (i.e., a current signal that generates a magnetic field radiated from the cable at a frequency selected to be within the operating range of an associated magnetic field buried utility locator such as is described in the incorporated applications).

Figure 2A:
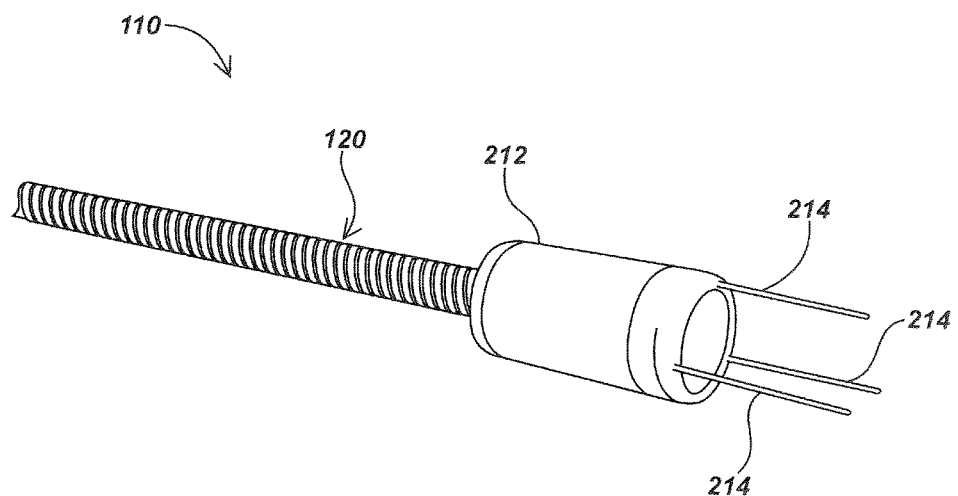
FIG. 2A is a detailed illustration of the system embodiment of FIG. 1.
Figure 2B:
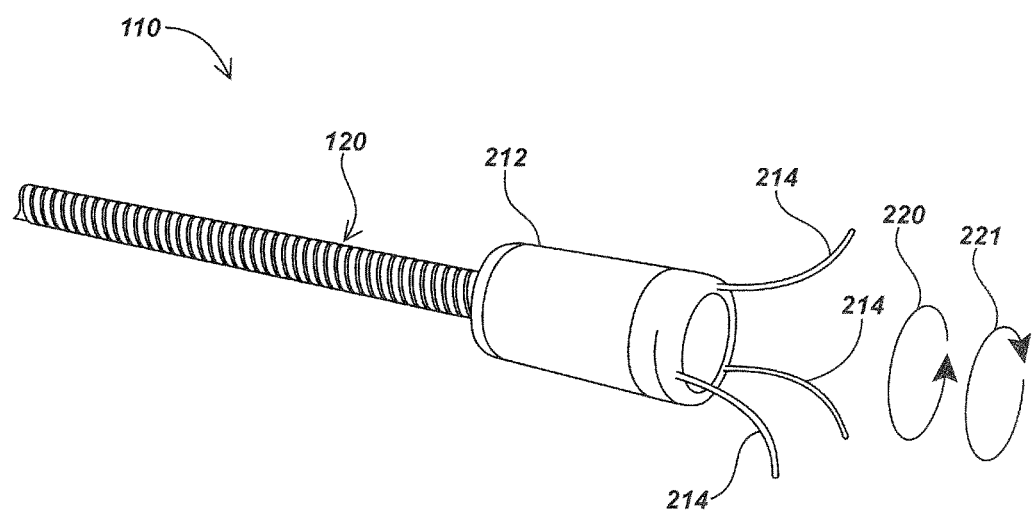
FIG. 2B illustrates the embodiment of FIG. 1 with filaments pushed outward due to centrifugal force during rotations.

As illustrated in FIGS. 2A and 2B, the cleaning apparatus embodiment 110 may include an outer housing 212 that may be dimensioned to accommodate a length of a cable. The housing may include, amongst other elements, an electric motor (e.g., motor 560 of FIG. 5). In some embodiments the motor may be an AC motor driven by an AC signal. In other embodiments the motor may be a DC motor driven by a DC signal generated from a rectified or otherwise converted AC power signal.

When powered, the motor may rotate one or more cleaning implements, such as filaments 214 beyond the circumference of housing 212 and scrape, cut away, or otherwise remove debris or other obstructions from within a pipe or other conduit, such as the obstruction 170 shown in drain pipe 130 of FIG. 1. The motor may directly drive the cutting tools and/or transmissions, or other rotational speed changes and/or control mechanisms may be used to vary cutting speed. Speed changes and/or control may be implemented by associated control circuitry in or coupled to the push-cable or other system devices and/or in the cutting tools. Contrary to how existing drain cleaning systems and devices operate, the cleaning apparatus 110 may clear obstructions by advantageously rotating only filaments 214 while cable 120 need not rotate. Filaments 214 may be made to rotate in direction 220 or contrary direction 221, and/or in both directions, and may remove or cut away obstacles whilst rotating in either direction 220 or 221 or both. The filaments 214 may be, for instance, line trimmer line and the cutting end may be adapted so that the line is readily replaceable by a user, such as in a "weed wacker" type device or other cutting devices known or developed in the art. Other embodiments may use cutting heads or other cutting tools in place of or in addition to filaments and/or jetter heads and/or other high pressure jetter-cleaning elements such as narrow high pressure nozzles and the like.

Figure 3:
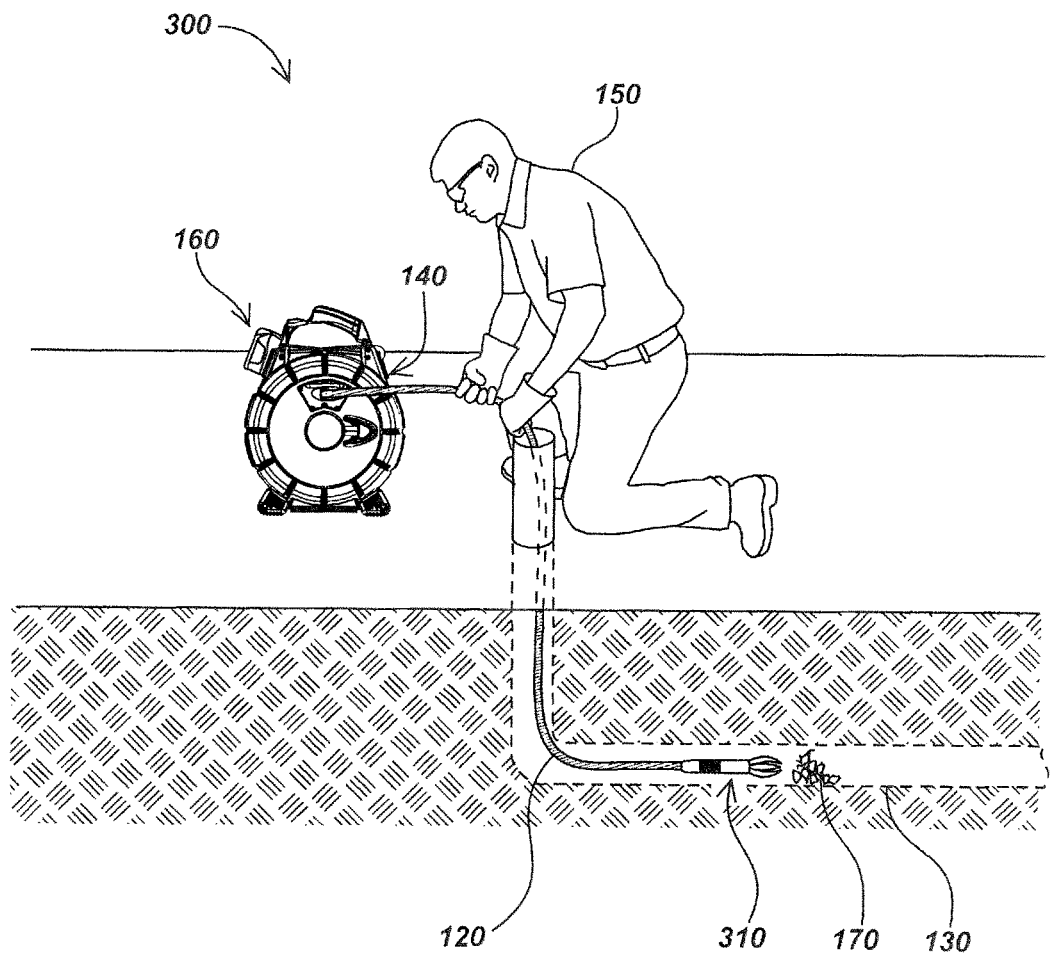
FIG. 3 illustrates details of another high frequency AC powered drain cleaning system embodiment.

In other embodiments, other types and configurations of cleaning implements may be used in cleaning apparatus and drain cleaning systems in keeping with the present disclosure. As illustrated in FIG. 3, a drain cleaning system embodiment 300 having such a cleaning apparatus 310 is illustrated. The drain cleaning system 300 may be or share aspects of the system 100 illustrated with FIG. 1 with a cleaning apparatus 310 in lieu of the cleaning apparatus 110 (FIG. 1).

Figure 4A:
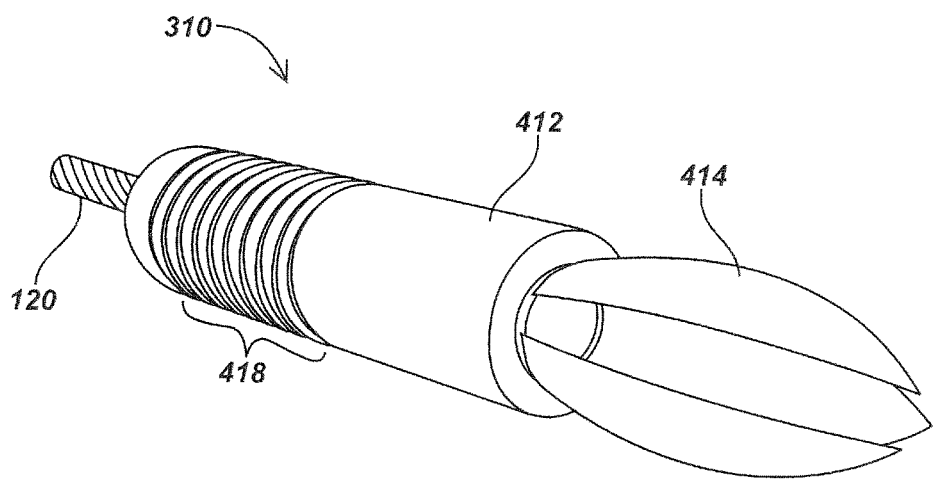
FIG. 4A is a detailed illustration of the embodiment of FIG. 3 with the blades in an at rest state.
Figure 4B:
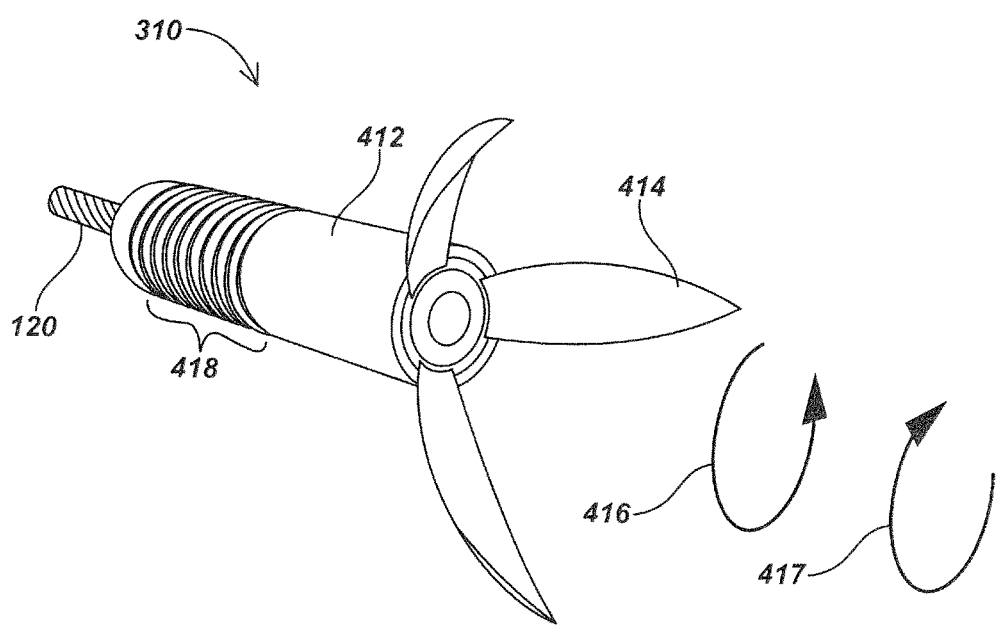
FIG. 4B is a detailed illustration of the embodiment of FIG. 3 with the blades deployed.
Figure 5:
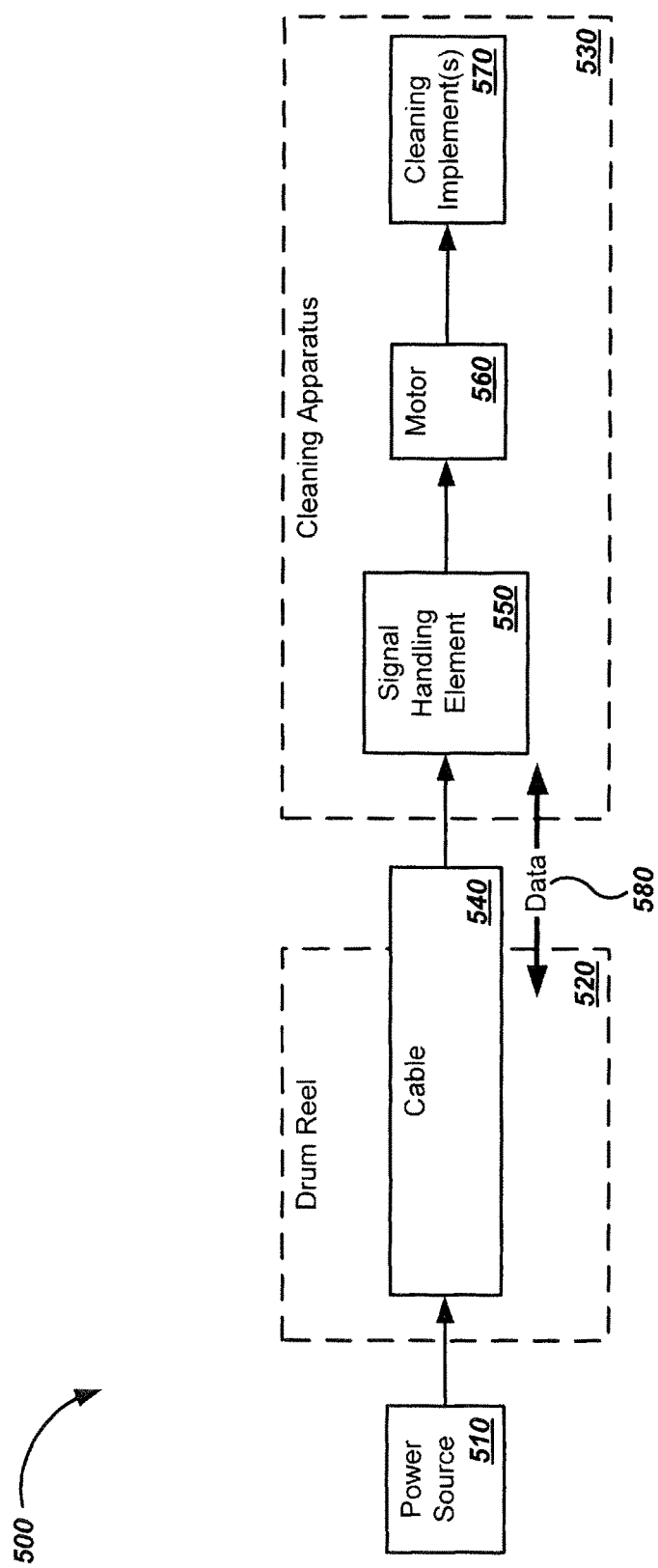
FIG. 5 is a diagram of a high frequency AC powered drain cleaning system embodiment.

As further illustrated in FIGS. 4A and 4B, the cleaning apparatus embodiment 310 may include an outer housing 412 that may include, amongst other elements, an electric motor such as the motor 560 described in FIG. 5. The cleaning apparatus 310 may have one or more blades 414 that may expand outwards via centrifugal force, in direction 416 or a contrary direction 417, from the internal motor when powered. The blades 414 may push outward and scrape along the interior of a pipe or other conduit to clear debris or other obstructions from within a pipe or other conduit. In cleaning apparatus 310, blades 414 may rotate while cable 120 may advantageously remain stationary to remove obstructions. When the cleaning apparatus 310 is not powered, blades 414 may be configured to return via springs, elastic flex, or like restoring mechanism to an at rest position as illustrated in FIG. 4A. When blades 414 are positioned in an at rest position as illustrated in FIG. 4A, the cleaning apparatus may more readily traverse small diameter pipes or other conduits. The cleaning apparatus 310 may further include a coil spring section 418 that may bend and flex allowing the cleaning apparatus to more readily negotiate bends and turns within a pipe or other conduit.

As described in the drain cleaning system embodiment 500 of FIG. 5, which may be the same as or share aspects with the drain cleaning system embodiment 100 of FIG. 1 or system embodiment 300 of FIG. 3, a power source 510 may be coupled to a drum reel 520 that may generate a high voltage and high frequency electrical signal from electrical power supplied by power source 510. In some embodiments, the power supply 510 may include a battery (e.g., battery 160 of FIG. 1 or 3) and an electronic inverter element or device to convert DC power from the battery to high voltage and high frequency AC power. In other embodiments, the input AC power may be AC line power, and the power source may include circuitry to step up the voltage and/or frequency to provide high voltage and high frequency output AC drive power signal carried by cable 540.

The high voltage and high frequency power signal may further be transmitted to a cleaning apparatus 530 secured to the distal end of cable 540 that may be dispensed from within drum reel 520. The cleaning apparatus 530 may include a signal handling/control element 550 further connected to a motor 560 coupled to rotate one or more cleaning implements 570 (e.g., filaments 214 of FIGS. 2A and 2B or blades 414 of FIG. 4A or 4B). Operating speed or rotations per minute (RPM) of motor 560 may be variable and, in some embodiments, clocked from or derived from the AC signal transmitted via cable 540 or from other data or signals provided to the motor or associated control device.

In some embodiments, the motor 560 may be a DC motor (e.g., brushless DC motor) and the signal handling element 550 may convert AC signal to DC, such as via inverter circuitry or other AC to DC circuitry as known or developed in the art. In some embodiments, data and/or control signals to and from the cleaning apparatus 530 and/or other system devices (e.g., camera 810 of FIG. 8) may be provided along the cable to the signal handling element 550 and may be processed or otherwise used or distributed via signal handling element 550.

Figure 6:
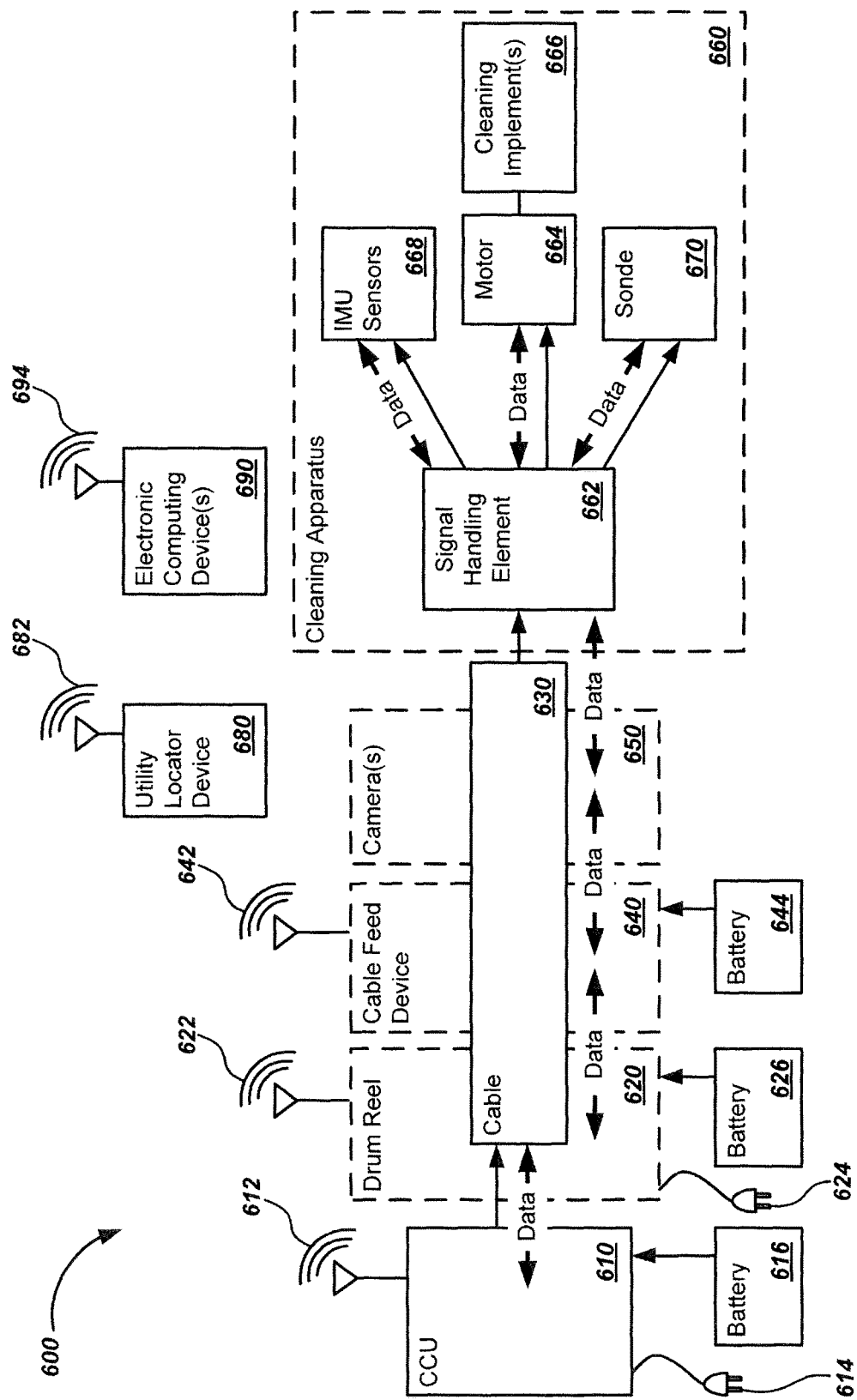
FIG. 6 is a diagram of another high frequency AC powered drain cleaning system.

A data link 580 may further be used to establish communications controls and or other information transfer between drum reel 520 and cleaning apparatus 530. For instance, control over motor 560 (e.g., on/off control, varying of motor speeds, and the like) may be achieved by data signals transmitted via data link 580. Data signals of data link 580 may be carried by cable 540 and/or may be provided via separate data communications links in some embodiments, such as via separate or shared data cables or additional signal lines in the push-cable. In some embodiments, the data link 580 may be implemented through modulation of the AC power signal to communicate data or through a separate signal (e.g., radio communication signals described in FIGS. 6 and 12) carried via cable 540 or other wired or wireless means.

A drain cleaning system in accordance with aspects of the present disclosure may include various other system devices connected via the cable or other wires as well as those connected via radio transceiver for communicating controls, camera imagery/video, and/or other drain cleaning system data. The radio transceivers described herein may utilize various wireless technologies including, but not limited to, Bluetooth, WIFI, ISM radio, and the like. For instance, the exemplary system embodiment 600 shown in FIG. 6 may have a camera control unit (CCU) 610 with radio transceiver 612 connected to a drum reel 620 with radio transceiver 622. Such a connection may be a wired connection and/or a wireless connection between radios 612 and 622. One or more power sources, such as the AC line power 614 or battery 616 of CCU 610 or AC line power 624 or battery 626 of drum reel 620, may be included in system 600. The CCU 610 and/or drum reel 620 in embodiments such as system 600 may include circuitry to step up the voltage and frequency providing high voltage and high frequency output AC drive power signal carried by cable from the input power provided by the power source.

In various embodiments, power need only be supplied by one source, and power to each individual device, including other connected devices, may be communicated via cable 630 and/or other wired connection. Along cable 630, a cable feed device 640, which may be of the variety described in connection with FIGS. 9-10B, may be used to move the cable 630. The cable feed device may include a user control to actuate deployment or retraction of the cable within the pipe or cavity. Further, the cable feed device may include a radio transceiver 642 to wirelessly communicate data between various other system devices. A battery 644 may provide power to cable feed device 640. The cable feed device 640 may include a graphical display, such as the graphical display 912 illustrated in FIG. 9, to receive and display images or video generated by the camera(s) 650 disposed further along cable 630. A cleaning apparatus 660 may further be coupled at the distal end of cable 630 and generally within view of the camera(s) 650, thereby allowing the drain cleaning operation to be visible to users.

The cleaning apparatus 660 may include a signal handling element 662 further connected to motor 664 to rotate one or more cleaning implements 666 (e.g., filaments 214 of FIGS. 2A and 2B or blades 414 of FIGS. 4A and 4B). Operating speed or rotations per minute (RPM) of motor 664 may be variable and, in some embodiments, clocked from the AC signal transmitted via cable 630. In some embodiments, the motor 664 may be a DC motor (e.g., brushless DC motor) and the signal handling element 662 may convert AC signal to DC. In some embodiments, data and/or control signals processed via signal handling element 662 may include signals to and from the cleaning apparatus 660 and wired device connected along cable 630 (e.g., CCU 610, drum reel 620, cable feed device 640, and camera 650), sensors on or in the cleaning apparatus (e.g., inertial measurement unit (IMU) sensors 668), or other system devices indirectly connected via wireless means (e.g., utility locator device 680 or electronic computing device 690). The cleaning apparatus 660 may further include a magnetic field dipole sonde device 670 that emits a magnetic field dipole locating signal receivable at one or more magnetic field utility locator devices 680 for determining and/or mapping the location, orientation, and depth of the sonde 670, and thereby cleaning apparatus 660, within the ground. The sonde frequency may be an integer multiple of the AC power frequency (e.g., where sonde frequency multiplied by ten may equal the AC power frequency). In some sonde embodiments, the sonde frequency may be an even sub-harmonic of the AC power frequency (e.g., divide the 100 k AC power by 20 resulting in a 5 k Sonde frequency).

The utility locator device 680, which may be of the variety described in the various incorporated patents and patent applications, may include a radio transceiver 682 and one or more electronic computing devices 690 with radio transceivers 694 for communicating data and control signals to and from other system devices. The electronic computing device(s) 690 may include tablet computers, smart phones, laptops, cloud computing databases, base stations, and the like. The data and information gathered and collected via a drain cleaning system such as the system embodiment 600 shown in FIG. 6 may be further used to generate maps of the interior of the drain pipe as well as nearby ground surface that may further be stored (e.g., in a cloud database).

Figure 7B:
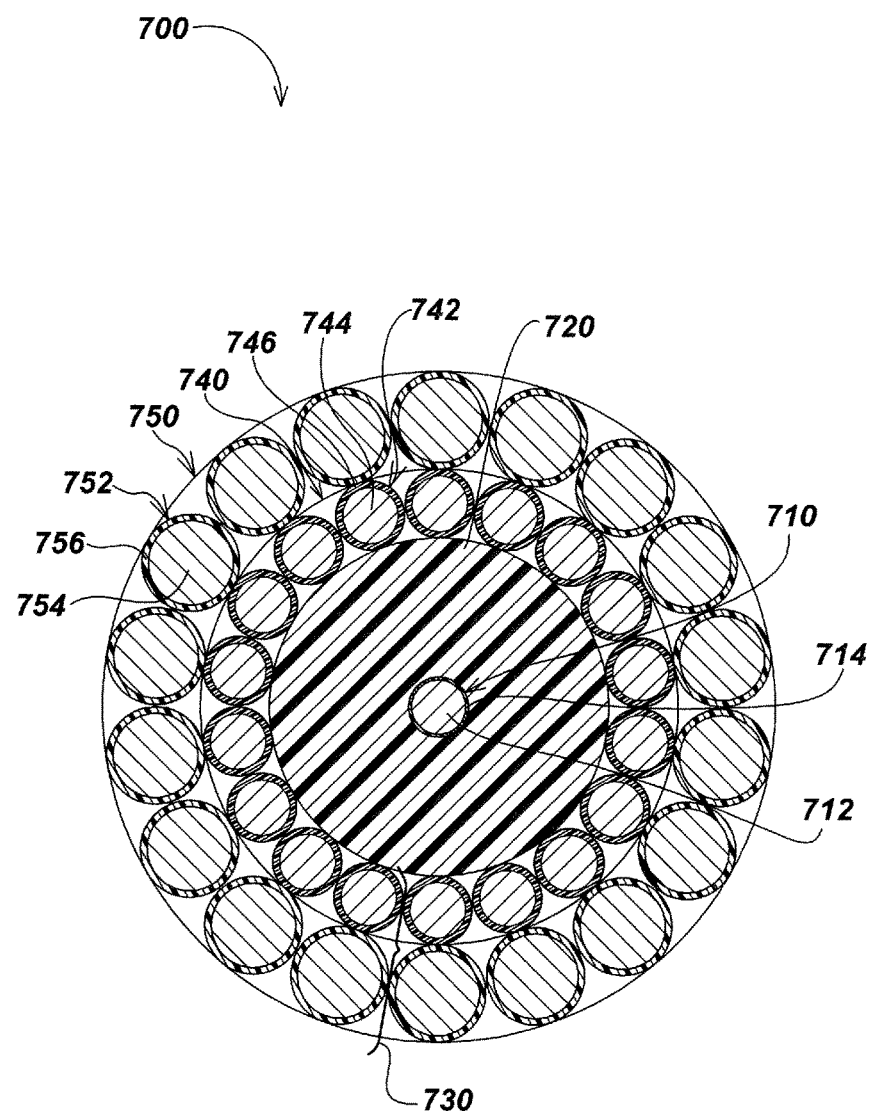
FIG. 7B is a cross-section view of the cable embodiment of FIG. 7A, taken along line 7B-7B.

Turning to FIGS. 7A and 7B, a drain cleaning cable embodiment 700 is illustrated which may be or share aspects of the cables of various embodiments herein. The cable embodiment 700 may include a coaxial conductor structure with an inner conductor 710, comprising layers 712 and 714, a dielectric element or layer 720, and an outer shielding element 730 further comprising an inner or first conductor shield array 740 and an outer or second conductor shield array 750. The dielectric element 720 may, for example, be of fiberglass, carbon fiber, or like materials. The first conductor shield array 740 and second conductor shield array 750 each comprise a multitude of individual conductors 742 and 752 that, as illustrated in FIG. 7A, may be helically wound about the dielectric layer 720 such that conductors 742 and 752 of each shield array 740 and 750 are wound in opposite directions providing torque or semi-torque balance to the cable 700.

The various conductors of cable 700 may have a strengthening element or layer and a conductive element or layer. As illustrated in FIGS. 7A and 7B, inner conductor 710 may have a strengthening layer 712 and a conductive layer 714, and each conductor 742 and 752 of shield arrays 740 and 750 may each respectively have an inner strengthening layer 744 or 754 and a conducting layer 746 or 756. The strengthening layers 712, 744, and 754 of conductors 710, 742, and 752 respectively may, for example, be structural steel wire with a cladding or conductive layer 714, 746, or 756 respectively, of copper or a copper alloy, or other high electrical conductivity materials or alloys of materials such as silver, gold, aluminum, graphene, nanostructure materials, and the like.

Where high frequency AC power is provided via a cable such as cable 700, most of the current flow will be towards the outer surface of the conductors due to the well-known skin effect. Therefore, the cable or conductors may be made as shown in FIGS. 7A and 7B, having an outer or structural layer of a strengthening material such as steel or steel alloy (which may have a relatively low electrical conductivity) for deployment by force into a pipe or cavity and retraction by force therefrom, an inner conductor or conductive layer of a high electrical conductivity material, such as a copper, for carrying current with a minimum of resistive loss which may be bonded or cladded upon the strengthening layer. The inner conductor may include a structural core and an outer layer. In cable 700, current may flow "outbound" in the inner conductor 710 and return through the conductor shield arrays 740 and 750 of the outer shielding element 730 (it is noted that the sense of "outbound" and "return" current is provided solely for explanation—it is apparent that AC current will flow in both directions within the inner conductor and outer conductor array). In an embodiment, the cable may further include a dielectric layer and an outer array or arrays of shield conductors. The cable may provide a high frequency, high voltage AC power to a pipe cleaning apparatus and/or a camera head coupled at the distal end from a high frequency AC power source coupled at the proximal end.

Unlike existing cables of this type in the art, the cable embodiment 700 illustrated in FIGS. 7A and 7B may be used without an exterior jacket. The lack of such an exterior jacket may facilitate the use of cable 700 in a cable feed device, such as the cable feed device 910 of FIGS. 9-10B, without causing damage to the cable or the robust conductors thereof. In cables known in the art, a cable feed device may damage the generally fragile conductors and/or shielding or other fragile components.

Some system embodiments in keeping with the present disclosure may include the use of various other pipe inspection and utility locating and mapping devices. The drain cleaning system embodiment 800 illustrated in FIG. 8 may be or share aspects of the drain cleaning system embodiment 100 of FIG. 1 with the addition of a pipe inspection camera 810 that may generate images or video from within pipe 130 to a camera control unit (CCU) 820, such as is described in the incorporated applications. System 800 may further include a utility locator device 830 that may receive and use magnetic fields emitted from the high frequency AC signals applied to the cable 120 to determine and map the location of the cable 120, also described in the incorporated applications. The AC power signal carried via cable 120 may result in a locatable signal at utility locator device 830 for use in locating the cable under the ground or other surface.

In yet further system embodiments, an automatic cable feed device may be included for moving the cable without the need for a user to apply force to move the cable. The drain cleaning system embodiment 900 illustrated in FIG. 9 may be or share aspects with the system embodiment 100 of FIG. 1 with the addition of a cable feed device 910 for moving the cable 120 as controlled by the user 150. The cable feed device 910 may include a graphical display 912 to receive and display images or video generated by pipe inspection camera 920. In some embodiments, a smart phone, tablet, or other electronic computing device with graphical interface may be used in lieu of the graphical display 912. In yet other embodiments, a cable feed device may not have the graphical display 912 at all.

In various drain cleaning embodiments described herein, various sensors may be included in the cleaning apparatus, camera, and/or otherwise in the distal end of the cable that may generate and communicate data back to the various system devices and apparatus. For instance, in some embodiments inertial navigation sensors may be included on or in the distal end of the cable that may provide data for feedback control of the cable feed device. This may include a cable feed device that may emulate motions and techniques commonly employed by users in drain cleaning and pipe inspection industries. For instance, the cable feed device may feed the cable in an abrupt acceleration, shaking, popping, or push-pull type motion when encountering an obstruction in order to facilitate the obstruction's removal. Such motions may be initiated through user control or automated when an obstruction is detected.

Figure 10A:
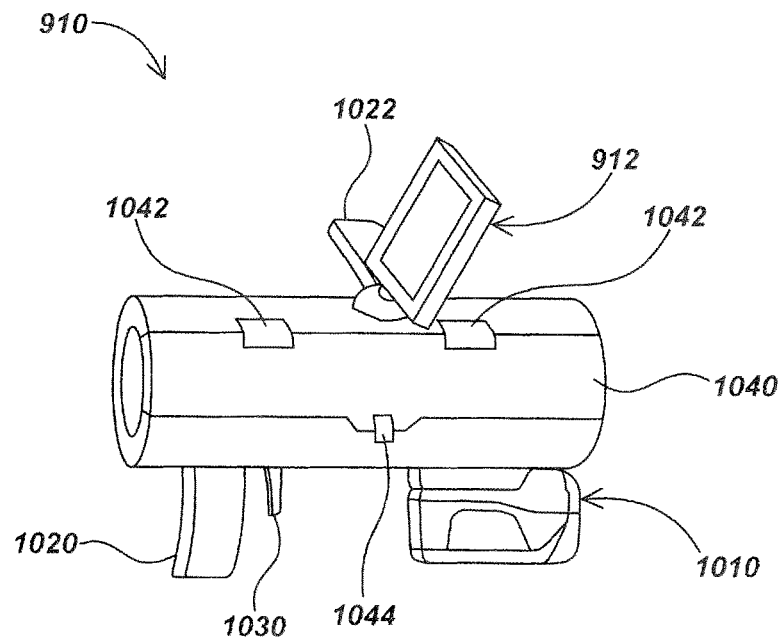
FIG. 10A is a detailed illustration of the cable feed device embodiment of FIG. 9.
Figure 10B:
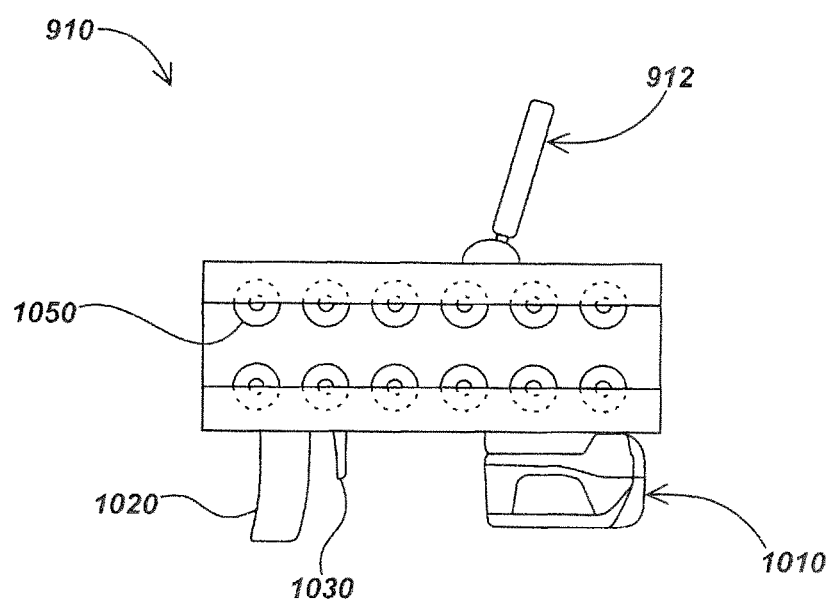
FIG. 10B is another detailed illustration of the cable feed device embodiment of FIG. 9.

As further illustrated in FIGS. 10A and 10B, the cable feed device embodiment 910 may have a battery 1010 or other power source to provide power to an internal mechanism for moving a cable (e.g., one or more motors that may spin wheels 1050 of FIG. 10B). The cable feed device 910 may also include one or more handles such as handles 1020 and 1022 allowing a user to readily and ergonomically grasp the cable feed device 910 to aid in deployment or retraction of the cable. A trigger 1030 may be included on cable feed device 910 providing control to a user to actuate movements of a cable moving forwards or backwards and the speed at which the cable may be moved. In other embodiments, a cable feed device in keeping with the present disclosure may include controls for moving a cable as well as other system devices such as controls over a cleaning apparatus, camera settings, lighting settings, and the like. The cable feed device 910 may also include a door 1040 allowing a section of cable to be placed within. A series of hinges 1042 and a latch 1044 may be included with door 1040 to aid in keeping a cable securely therein when door 1040 is closed and to allow the cable to be removed or placed within the cable feed device 910 when the door 1040 is opened. In cable feed device 910 one or more wheels 1050 that may be motorized may grip the cable and push the cable as indicated by a user. In other embodiments, other internal mechanisms may be used to move a cable.

Figure 11A:
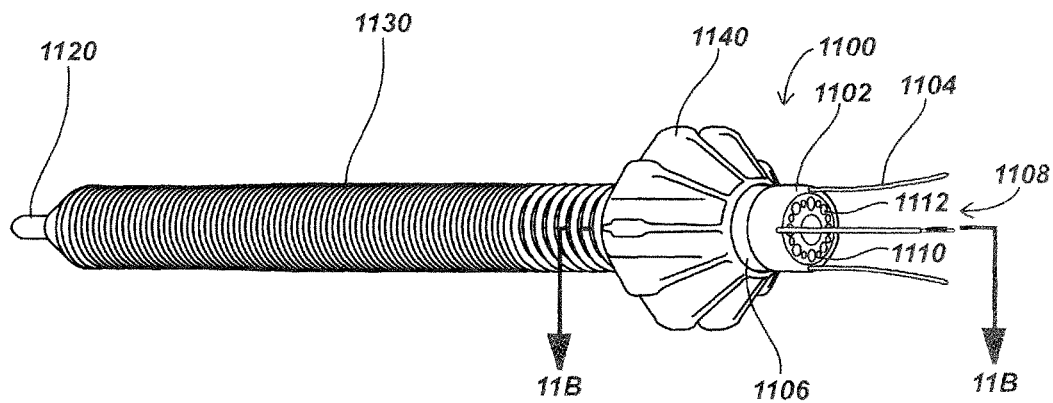
FIG. 11A is an isometric view of an embodiment of a high frequency AC powered inspection and cleaning apparatus, cable, and coil spring.

Further drain cleaning apparatus may combine one or more cameras within or coupled to the cleaning apparatus. As illustrated in FIG. 11A, an inspection and cleaning apparatus embodiment 1100 may include a cleaning implement retainer element 1102 containing cleaning implements 1104. The cleaning implements 1104 may be nylon strands or commercial line trimmer line readily replaceable by a user. The cleaning implements 1104 may further be adapted to rotate about a housing 1106 containing an inspection camera module 1108 that may remain still as the cleaning implement retainer element 1102 and cleaning implements 1104 rotate thereabout. The inspection camera module 1108 may be a self-leveling camera head as described in the incorporated patents and patent applications.

The inspection camera module 1108 may include one or more illumination elements, such as LED elements 1110, to illuminate the interior of the drain pipe or other work environment as well as one or more imaging elements 1112 to collect video and/or other images of the inspection and cleaning operation. The inspection and cleaning apparatus 1100 may connect to a cable 1120 via coil spring 1130. A pipe guide 1140 may be disposed about the housing 1106 of inspection and cleaning apparatus 1100 to aid in centering the inspection and cleaning apparatus 1100 within a pipe. The pipe guide 1140 may be removable from the inspection and cleaning apparatus 1100 by a user, allowing it to be replaced by other sizes and shapes of guide or to allow the use of the inspection and cleaning apparatus 1100 without a guide.

Figure 11B:
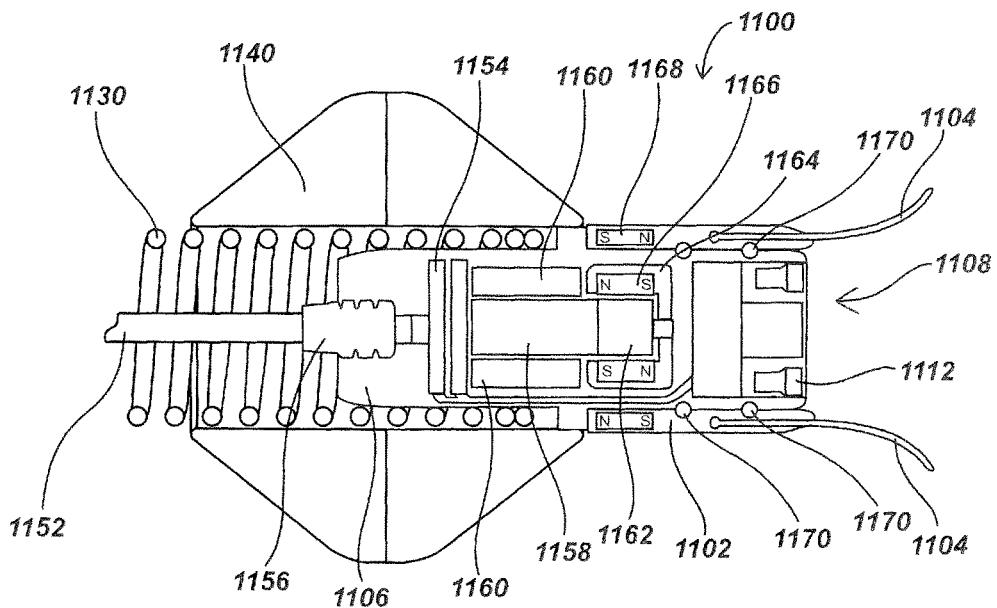
FIG. 11B is a section view of the inspection and cleaning apparatus embodiment of FIG. 11A along line 11B-11B.

Turning to FIG. 11B, a connector 1152 may be situated within the coil spring 1130 in the space separating cable 1120 (FIG. 11A) and a PCB stack 1154 disposed in housing 1106. The connector 1152 may carry power and data signals from cable 1120 (FIG. 11A) and communicate such signals to PCB stack 1154 and further onto various other sensors and components on or in the inspection and cleaning apparatus 1100. A sealing element 1156 may seat tightly about connector 1152 at the entrance into housing 1106 providing protection to components contained within housing 1106 from the external environment. The PCB stack 1154 may contain circuitry and components associated with a signal handling element (e.g., signal handling elements 1212 of FIG. 12) for processing data and/or control signals. The PCB stack 1154 may further contain sensors such as inertial measurement unit (IMU) sensors 1216 of FIG. 12 and further provide power and data signals to other system devices and components such as motor 1158, sonde 1160, and inspection camera module 1108. The motor 1158 may be a brushless DC motor and the signal handling aspects of the PCB stack 1154 may convert the high voltage and high frequency AC signal to a DC output signal to motor 1158. A gearbox 1162 may be connected to motor 1158 providing speed and torque control to the rotation of the cleaning implement retainer element 1102 containing cleaning implements 1104.

In inspection and cleaning apparatus embodiment 1100, the motor 1158 and gearbox 1162 may connect to an arm element 1164 to rotate about the gearbox 1162. Arm element 1164 may further contain one or more magnets 1166 positioned in polar opposition to magnet(s) 1168 within housing 1106 in close proximity such that as the arm element is rotated, the cleaning implement retainer element 1102 containing cleaning implements 1104 may rotate in the same direction due to the polar attraction of magnets 1166 and 1168. A series of bearings 1170 may be seated between housing 1106 and cleaning implement retainer element 1102 to mitigate friction and allow the cleaning implement retainer element 1102 to more freely rotate.

Figure 12:
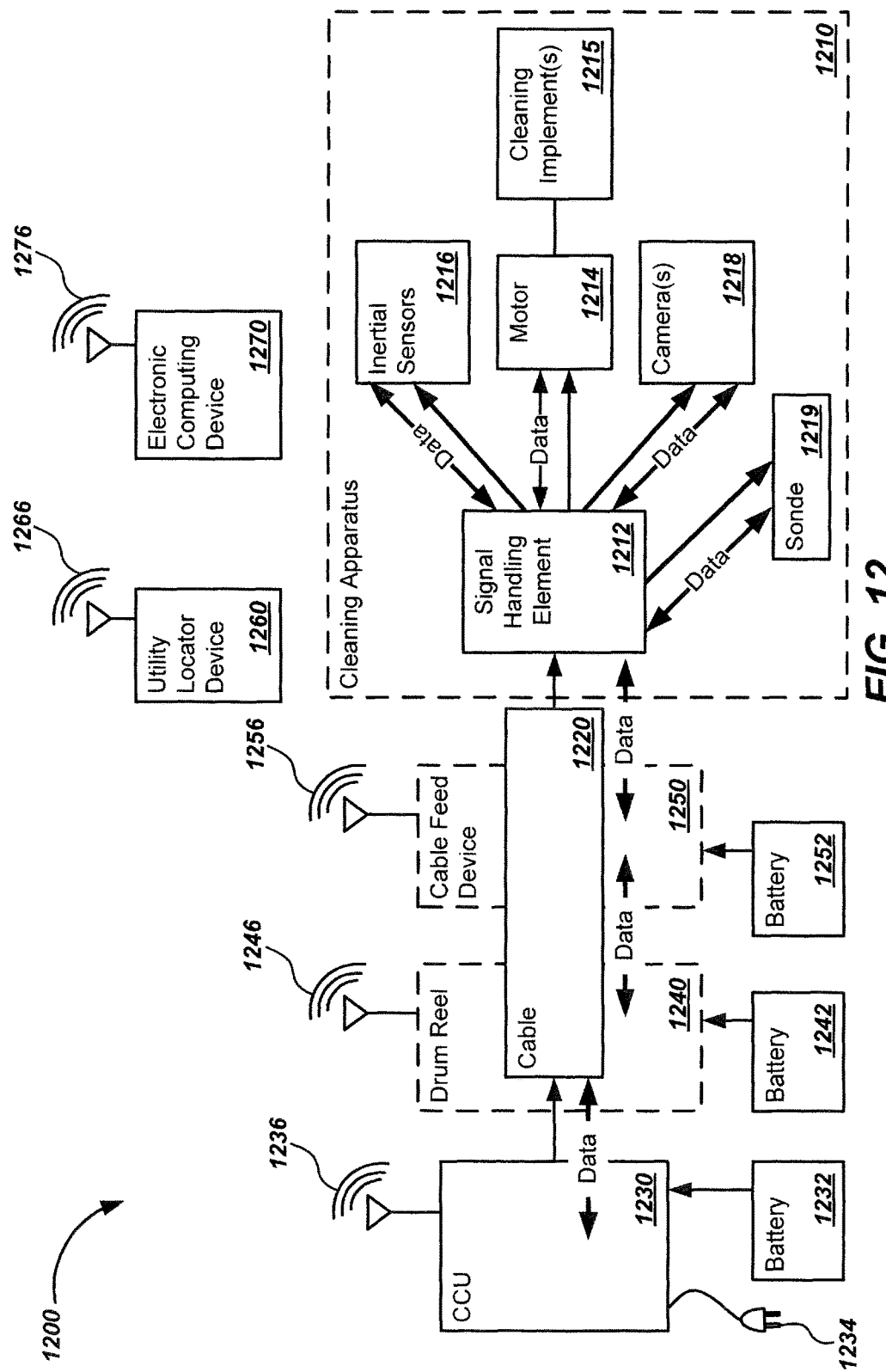
FIG. 12 is a diagram of an embodiment of a high frequency AC powered inspection and cleaning system.

Turning to FIG. 12, an inspection and cleaning system embodiment 1200 is illustrated, having an inspection and cleaning apparatus 1210 which may be of the variety described with FIGS. 11A and 11B. For instance, the cleaning apparatus 1210 may contain a signal handling element 1212 for receiving high frequency AC power signal and data signals provided via cable 1220 from a connected power source containing system device (e.g., CCU 1230 having battery 1232 or input AC line power 1234, drum reel 1240 having battery 1242, cable feed device 1250 having battery 1252) to output high frequency AC signal and data signals as previously described. The signal handling element 1212 may further convert the high frequency AC signal to DC and provide an output power signal and data signal(s) to a motor 1214.

Motor 1214 may either connect directly to cleaning implements 1215 to provide the rotational force to rotate cleaning implements 1215 or indirectly connect (e.g., with gears such as gearbox 1162 or other intermediary components such as the arm element 1164, magnets 1166 and 1168, and cleaning implement retainer element 1102 described in FIG. 11B) between motor 1214 and cleaning implements 1215. The signal handling element 1212 may likewise provide power and data signals to IMU sensors 1216, camera(s) 1218, and sonde 1219.

System 1200 may further include other system devices including, but not limited to, magnetic field utility locator devices 1260 and various electronic computing devices 1270 (e.g., tablet computers, smart phones, laptops, cloud computing databases, base stations, or the like). Various system devices may further include radio transceivers (e.g., Bluetooth, WIFI, ISM radio, and the like) for communicating data. For instance, data links may be shared between CCU 1230 with radio transceiver 1236, drum reel 1240 with radio transceiver 1246, cable feed device 1250 with radio transceiver 1256, utility locator device 1260 with radio transceiver 1266, and electronic computing device 1270 with radio transceiver 1276.

As previously described, an automatic cable feed device, such as cable feed device 1250, may receive data transmitted from various systems or devices including, but not limited to, an apparatus disposed on the distal end of a cable, such as cleaning apparatus 1210 on cable 1220. Such data may include position data such as that drum-reel revolution count data corresponding to revolution of the drum reel 1240, motor drive current data corresponding to driving current of the motor 1214, cable odometry data corresponding to the cable 1220, and/or positional data pertaining to the position of cleaning apparatus 1210 or other apparatus disposed on the distal end of the cable. The positional data may further be communicated back to a user (e.g., displaying a map, measurement of distance within the pipe, and/or other indicators of position via graphical display 912 on cable feed device 910 of FIGS. 9-10B) and/or may further generate recommended control input which may be automatically or manually applied by the user to promote desired rotation of the distal end coupled device.

Figure 13:
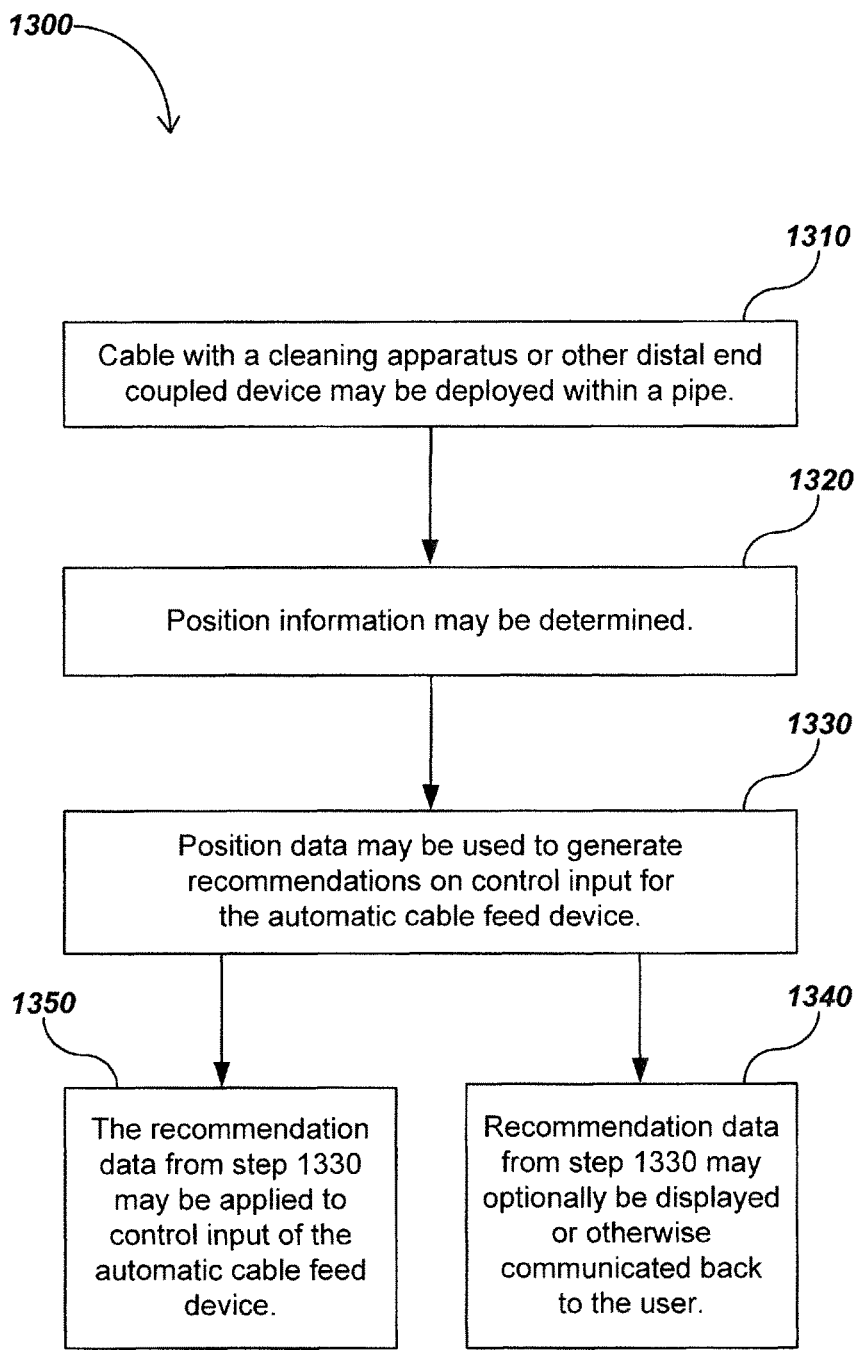
FIG. 13 illustrates details of an embodiment of a method for generating control input for an automatic cable feed device.

FIG. 13 describes a method 1300 of generating control input for the automatic cable feed device, such as cable feed device 1250. At a first step 1310 of the method 1300, a cable with a cleaning apparatus or other distal end coupled device may be deployed within a pipe. In a second step 1320, position data/information may be determined. For instance, positional data, such as cable payout odometry data, inertial data or feedback from a distal end coupled device to, for example, modulate and control rate of retraction, drum reel revolution count, and so forth may be used to determine and/or map location of the distal end coupled device within the pipe. The position data may be related to a user control input to provide a first feedback message pertaining to movement within the pipe or cavity. In a step 1330, such data may be used to generate recommendations on control input for the automatic cable feed device. For example, the first feedback message may be used to generate a recommended control input. This step may be achieved within a processor of the automatic cable feed device or other connected device and communicated back to the automatic cable feed device. In a next step 1340, the recommendation data from step 1330 may optionally be displayed or otherwise communicated back to the user. For instance, a map of cable movements within the pipe may be generated and displayed on a display element, such as a graphical user interface on the automatic cable feed device. In a parallel optional step 1350, the recommendation data from step 1330 may be automatically applied to control input of the automatic cable feed device. Control input recommendations, such as that generated at step 1330 of FIG. 13 may further include recommendations to surpass obstacles encountered by the cable within the pipe.

Figure 14:
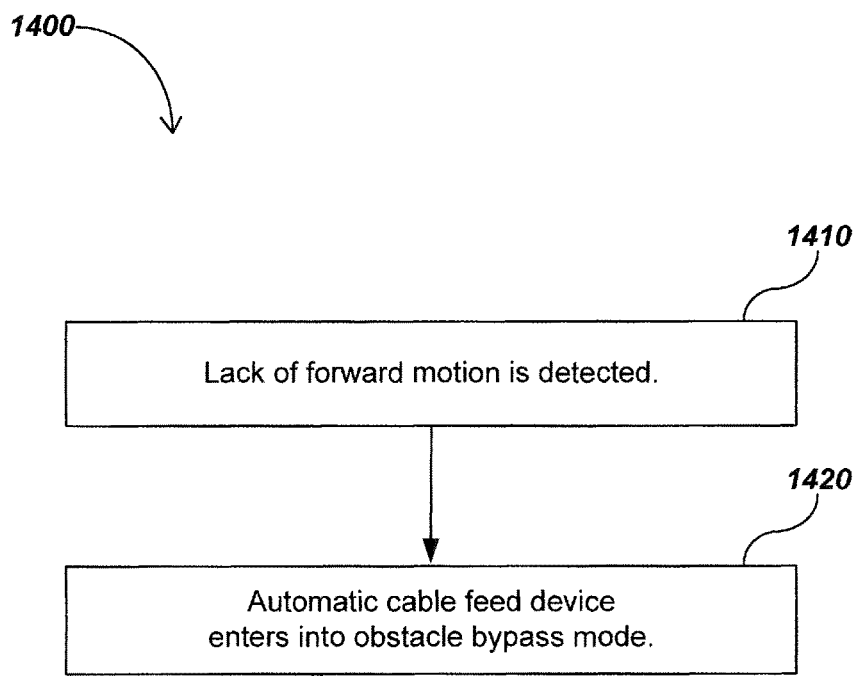
FIG. 14 illustrates details of an embodiment of a method for overcoming obstacles within a pipe.

Turning to FIG. 14, a method 1400 describes such a method for handling such in pipe obstacles. In a first step 1410, a lack of forward motion in the pipe or other void may be detected by the automatic cable feed device. Once a lack of forward motion is detected, in a step 1420, the automatic cable feed device may enter an obstacle bypass mode. The obstacle bypass mode may involve the cable being fed at random speeds, durations, and/or directions to move the first distal end coupled device past obstacles within the pipe. Such movements may have a forward bias or may be otherwise constructed or parameterized to promote an overall forward motion in the pipe or void.

Figure 15:
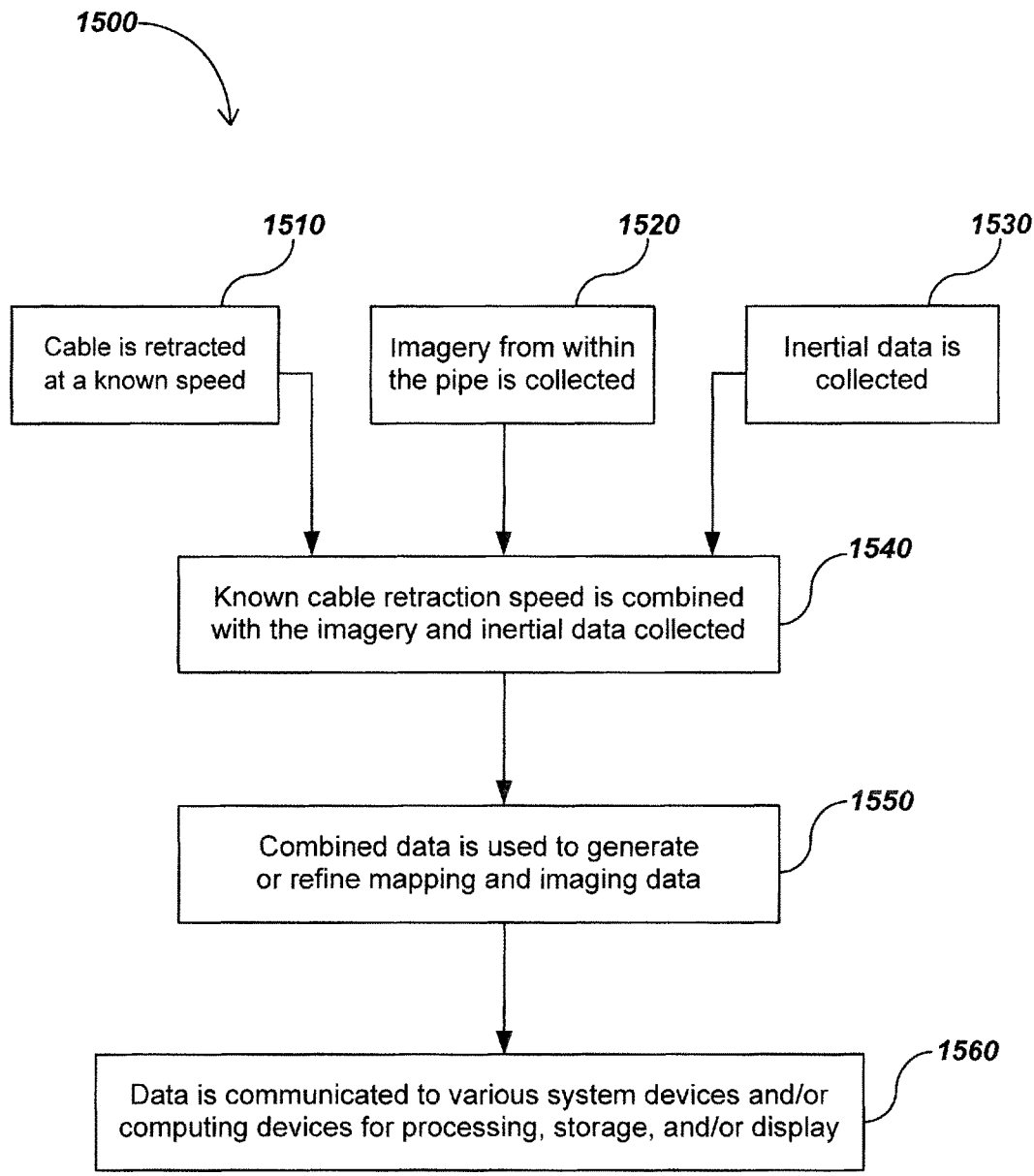
FIG. 15 illustrates details of an embodiment of a method for refining pipe mapping data.

The retraction of a cable via an automatic cable feed device in keeping with the present disclosure may be done at a prescribed rate for purposes of processing of images collected within the pipe as well as inertial mapping of the pipe. As described in method 1500 of FIG. 15, a first step 1510 may include retracting the cable at a known speed. In a parallel step 1520 imagery from within the pipe may be collected. In another parallel step 1530 inertial data may be collected. In a subsequent step 1540, the known cable retraction speed may be combined with the imagery and inertial data collected. In some method embodiments, such inertial data and imagery may include that collected when the cable is fed into the pipe prior to retraction of the cable. In a step 1550, the combined data may be used to generate or refine mapping and imaging data.

In a step 1560, such data may further be communicated to various system devices and/or computing devices for processing, storage, and/or display. In some such embodiments, known retraction speed may be constant. The constant rate of retraction may combine with the image data (e.g., imagery) and inertial data to determine parameters of the pipe (e.g., pipe diameter or path of the pipe) to characterize various parameters (e.g., pipe diameter, pipe path, etc.) of the pipe or cavity. In other embodiments, the known retraction speed may be variable. For instance, the retraction rate may increase in straight sections of pipe and/or decrease in non-straight pipe sections. In such embodiments, transitions between retraction rates may be smoothed. In another embodiment, the cable feed rate may increase in straight sections of the pipe and may decrease in non-straight sections of the pipe. In such an embodiment, transitions between feed rates may be smoothed The motorized feed element of the automatic cable feed devices in keeping with the present disclosure may be clutched out or otherwise disconnected. In some such embodiments, the automatic cable feed device may allow the clutch to disengage and allow a user to impart force to feed a cable into the pipe or other cavity. For instance, a user may choose to disengage the clutch to allowing an obstacle within the pipe or other cavity to be overcome. In further such embodiments, the actions, motions, and forces imparted by the user may be learned and reproduced by an automatic cable feed device in overcoming future obstacles automatically. For instance, artificial intelligence or other machine learning techniques and algorithms may be applied to user supplied cable payout data to determine and refine methods to best overcome such in use obstacle.

Figure 16:
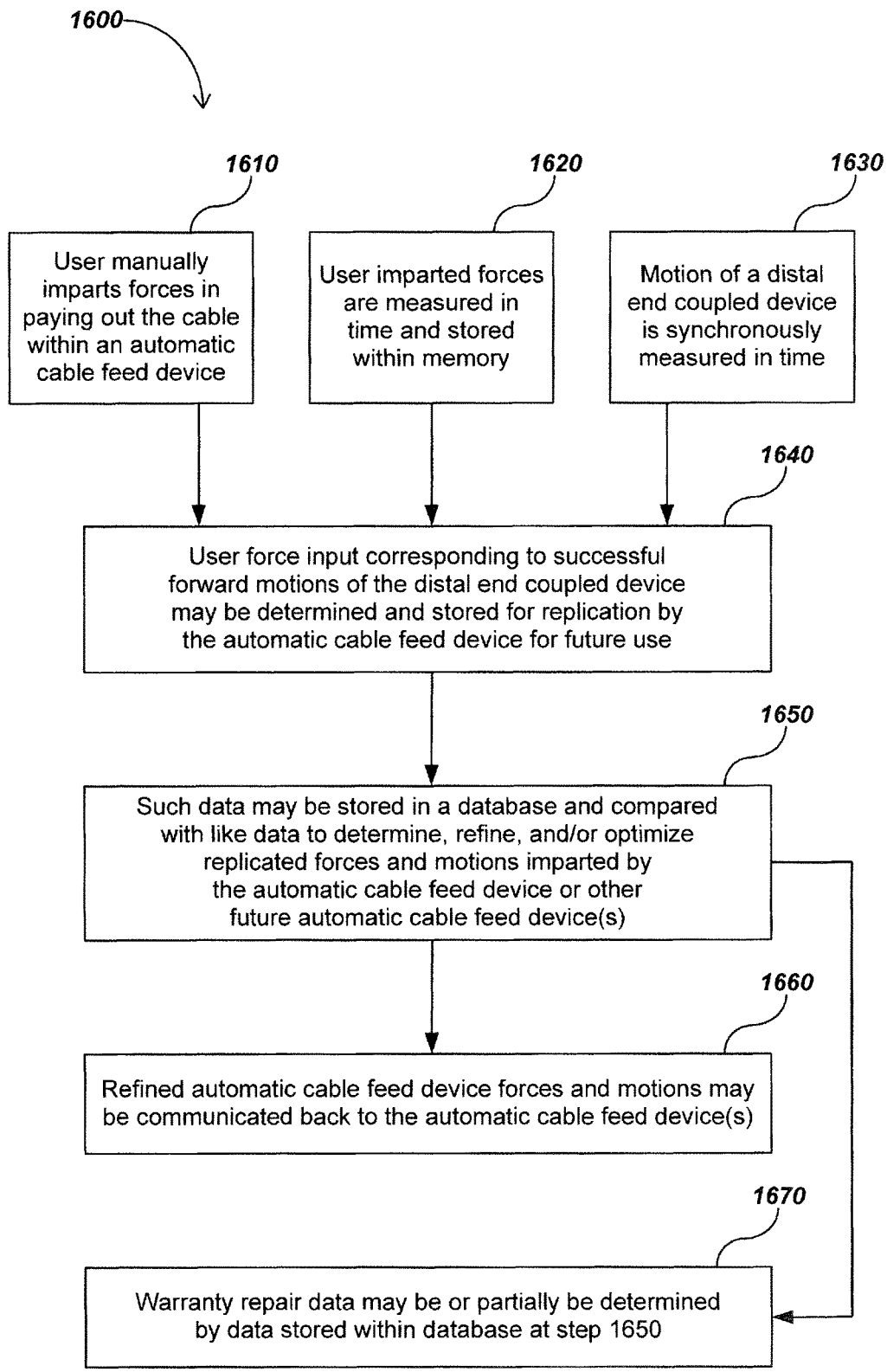
FIG. 16 illustrates details of an embodiment of a method for determining and refining successful automatic forward motions imparted by an automatic cable feed device as well as determining warranty repair data.

Turning to FIG. 16, one such method 1600 for machine learning relating to automatic cable feed devices is described. In a first step 1610, a user may manually impart forces in paying out the cable within an automatic cable feed device. Within step 1610 the clutch of an automatic cable feed device may be disengaged. In a parallel step 1620, the user's force inputs are measured in time. Such user force input may be stored within memory of the automatic cable feed device or other connected devices. In a parallel step 1630, the corresponding motion of a distal end coupled device is synchronously measured in time. Likewise, motions of the distal end coupled device's motion corresponding to user force inputs may be stored within memory of the automatic cable feed device or other connected devices.

In a step 1640, user force input corresponding to successful forward motions of the distal end coupled device may be determined, for example, by correlating the successful forward motion with the force inputs to identify force input schedules yielding forward motion generated by genetic algorithms, and stored for replication by the automatic cable feed device for future use. For example, the force input schedules which may yield forward motion may be uploaded on a central server, and may be recalled or compared.

Optionally, in a step 1650, such data may be stored in a database and compared with like data to determine, refine, and/or optimize replicated forces and motions imparted by the automatic cable feed device or other future automatic cable feed device(s). Step 1650 may include machine learning algorithms, artificial intelligence, genetic algorithms, and/or other such algorithms and techniques for determining, refining, and/or optimizing such automatic cable feed device forces and motions. In a step 1660, refined automatic cable feed device forces and motions may be communicated back to the automatic cable feed device(s). For instance, the database may redistribute data to other automatic cable feed devices connected to the internet either directly or indirectly through other connected system devices. In a step 1670 parallel to step 1650, warranty repair data may be or partially be determined by data stored within database at step 1650. For instance, such data may provide information about proper use or misuse of the distal end coupled device for determining warranty repair liability. In an example, the force input schedule and motion data may be correlated with the warranty repairs.

Other combinations of the elements, components, features, and/or functions described previously herein may be combined in various embodiments. In addition, details regarding additional aspects, elements, components, features, functions, apparatus, and/or methods which may be used in additional embodiments in conjunction with disclosures herein are described in the co-assigned incorporated applications.

Those of skill in the art would understand that information and signals, such as analog or video signals, data signals, audio signals, or other information signals may be represented and transmitted using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The scope of the presently claimed invention is not intended to be limited to the aspects shown and described previously herein, but should be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed embodiments and aspects is provided to enable any person skilled in the art to make or use embodiment of the present invention. Various modifications to these embodiments and aspects will be readily apparent to those skilled in the art, and the generic principles defined herein may be applied to other embodiments and aspects without departing from the spirit or scope. Therefore, the presently claimed invention is not intended to be limited specifically to the aspects and embodiments shown herein, but is to be accorded the widest scope consistent with the appended Claims and their equivalents.

We claim:

1. A drain cleaning system, comprising:
   a camera control unit (CCU);
   a cable having a distal end and a proximal end, the cable adapted for carrying electrical control and/or data signals as well as alternating current (AC) power at a high power, high voltage, and an AC frequency of approximately 1 kHz or more;
   the cable having a length of ten meters or more and mechanically structured so as to be deployed and retracted into a pipe or cavity by human or mechanically applied force;
   a power source for supplying the high frequency, high voltage AC electrical power, the power source operatively connected at the proximal end of the cable;
   a cleaning apparatus coupled to the distal end of the cable, the cleaning apparatus including a signal handling/control element separate from the CCU controlling the provided AC power;
   an electric motor disposed at the distal end of the cable and operatively coupled to the signal handling/control element rotatable in accordance with signaling provided from the signal handling/control element, and
   a drum-reel for storing and deploying the cable therefrom.

2. The system of claim 1, wherein the cleaning apparatus comprises a pipe cleaning implement operatively coupled to the electric motor to forcibly remove obstructions.

3. The system of claim 2, wherein the power is at an AC frequency of five thousand Hertz or higher and a voltage of one hundred volts or higher and the pipe cleaning implement comprises a plurality of expandable blades.

4. The system of claim 2, wherein the power is at an AC frequency of twenty thousand Hertz or more and a voltage of one hundred volts or higher.

5. The system of claim 2, wherein the power is at an AC frequency of one hundred thousand Hertz or more and a voltage of one hundred volts or higher.

6. The system of claim 2, wherein the power is at an AC frequency pre-selected so as to minimize physical harm in the event of a cable failure when operated at a predefined power level at a predefined high voltage based on a combination of skin effect as a function of the preselected AC frequency and voltage.

7. The system of claim 2, further comprising a camera operatively coupled along a portion of or at the distal end of the cable, the camera including an image sensor for generating images of an interior of a pipe or cavity in which the camera element is inserted.

8. The system of claim 7, wherein the camera is integral with the pipe cleaning implement.

9. The system of claim 8, wherein the camera is a self-leveling camera.

10. The system of claim 2, wherein the pipe cleaning implement comprises a plurality of blades including a restoring mechanism to deploy the blades during rotation and retract the blades when the motor is at rest.

11. The system of claim 2, wherein the high frequency motor is an AC motor.

12. The system of claim 2, wherein the motor is a DC motor and the pipe cleaning implement includes inverter electronics to convert the high frequency AC power to a DC output signal for driving the DC motor.

13. The system of claim 2, wherein the pipe cleaning implement comprises a plurality of filaments.

14. The system of claim 1, further comprising a magnetic field dipole sonde.

15. The system of claim 1, further comprising an inertial navigation sensor coupled to the cable or to a device coupled to the cable for providing data for feedback control of a cable feed device.

16. The system of claim 1, wherein the cable includes a structural core comprising a steel alloy, a dielectric layer, and a core outer layer, wherein the core outer layer comprises a cladding of a high electrical conductivity material.

17. The system of claim 16, comprising two or more layers of shield conductors, wherein a first layer of shield conductors are helically wound about the dielectric layer in a first direction, and the second layer of shield conductors are helically wound about the first layer in a direction opposite to the first direction.

18. The system of claim 1, wherein the cable includes:
a cable outer layer mechanically adapted for deployment by force into a pipe or cavity and retraction by force therefrom;
an inner conductor including a structural core and a core outer layer;
a dielectric layer; and
an outer array or arrays of shield conductors.

19. The system of claim 18, wherein the structural core comprises a steel alloy and the outer layer or outer array comprises a cladding of a high electrical conductivity material.

20. The system of claim 18, wherein the dielectric layer comprises fiberglass.

21. The system of claim 18, wherein the dielectric layer comprises carbon fiber.

22. The cable system of claim 18, wherein the shield conductors of the outer array or arrays comprises a steel alloy and the outer layer comprises a cladding of a high electrical conductivity material.

23. The system of claim 18, comprising two or more layers of shield conductors, wherein a first layer of shield conductors are helically wound about the dielectric layer in a first direction, and the second layer of shield conductors are helically wound about the first layer in a direction opposite to the first direction.

24. The system of claim 1, further comprising an automatic cable feed device for feeding the cable into a pipe or cavity, the cable feed device comprising:
a motorized feed element configured to feed or retract the cable; and
a user control to actuate deployment or retraction of the cable within the pipe or cavity.

25. The system of claim 1, further comprising a connector adapted to couple AC power and images, video, and/or data from a power source to the cable.

26. The system of claim 25, wherein the cable feed device is integral within the drum-reel.

27. The system of claim 1, further comprising one or more handles or grips allowing a user to ergonomically grasp the cable feed device so as to aid in deployment or retraction of the cable therefrom.

28. The system of claim 1, further comprising one or more inertial measurement unit (IMU) sensors for providing power and data signals to one or more of the electric motor, a Sonde, or an inspection camera module.

29. A drain cleaning system, comprising:
a camera control unit (CCU);
a cable having a distal end and a proximal end, the cable adapted for carrying electrical control and/or data signals as well as alternating current (AC) power at a high power, high voltage, and an AC frequency of approximately 1 kHz or more;
the cable having a length of ten meters or more and mechanically structured so as to be deployed and retracted into a pipe or cavity by human or mechanically applied force;
a power source for supplying the high frequency, high voltage AC electrical power, the power source operatively connected at the proximal end of the cable;
a signal handling/control element separate from the CCU for controlling the provided AC power;
a PCB stack including circuitry and components for processing data and control signal associated with the signal/handling control element;
an electric motor disposed at the distal end of the cable and operatively coupled to the signal handling/control element rotatable in accordance with signaling provided from the signal handling/control element, and
a drum-reel for storing and deploying the cable therefrom.

* * * * *